(12) United States Patent
Takahashi et al.

(10) Patent No.: US 10,547,689 B2
(45) Date of Patent: Jan. 28, 2020

(54) INFORMATION PROCESSING SYSTEM, INFORMATION PROCESSING DEVICE, INFORMATION PROCESSING METHOD, AND COMPUTER-READABLE RECORDING MEDIUM

(71) Applicant: FUJITSU LIMITED, Kawasaki-shi, Kanagawa (JP)

(72) Inventors: Eiichi Takahashi, Kawasaki (JP); Junichi Yura, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 293 days.

(21) Appl. No.: 15/376,780

(22) Filed: Dec. 13, 2016

(65) Prior Publication Data
US 2017/0230463 A1    Aug. 10, 2017

(30) Foreign Application Priority Data
Feb. 10, 2016 (JP) .................... 2016-024190

(51) Int. Cl.
*H04L 29/08* (2006.01)
*H04W 8/00* (2009.01)

(52) U.S. Cl.
CPC ............ *H04L 67/141* (2013.01); *H04L 67/22* (2013.01); *H04L 67/32* (2013.01); *H04W 8/005* (2013.01); *H04L 67/02* (2013.01)

(58) Field of Classification Search
CPC .............................. H04L 67/32; H04W 8/005
See application file for complete search history.

(56) References Cited

U.S. PATENT DOCUMENTS 7,958,458 B2 * 6/2011 Maeta ................ G06F 16/5838
715/804
8,601,104 B2 * 12/2013 Cohen .................. H04L 41/048
709/201

(Continued)

FOREIGN PATENT DOCUMENTS

JP        06-083785        3/1994
JP        2005-018194      1/2005

(Continued)

OTHER PUBLICATIONS

JPOA—Japanese Office Action for Japanese Patent Application No. 2016-024190 dated Sep. 3, 2019, with English translation.

*Primary Examiner* — Lashonda T Jacobs
(74) *Attorney, Agent, or Firm* — Fujitsu Patent Center

(57) ABSTRACT

An information processing system includes a linkage-source device, a plurality of linkage-destination devices that is connectable to the linkage-source device, and an application linkage device that controls linkages of applications respectively registered in the linkage-source device and the plurality of linkage-destination devices. The application linkage device includes a processor that executes a process includes managing device information including information used to be connected with a linkage-destination device and information on data to be used by the application registered in a relevant linkage-destination device, acquiring linkage candidates indicative of linkable linkage-destination devices and the linkable applications with reference to the device information with respect to a linkage request from the application of the linkage-source device, and activating the applications indicated as the linkage candidates and decides a device performing the linkage and a linkable application registered in the relevant device as a linkage destination from the linkage candidates.

13 Claims, 18 Drawing Sheets

(56) References Cited

U.S. PATENT DOCUMENTS

| | | | | |
|---|---|---|---|---|
| 8,855,608 B2* | 10/2014 | Morisaki | | G06Q 10/06 |
| | | | | 455/412.1 |
| 8,989,670 B2* | 3/2015 | Kiveisha | | H04B 5/0031 |
| | | | | 455/41.2 |
| 9,164,747 B2* | 10/2015 | Ono | | G06F 8/61 |
| 2004/0192299 A1* | 9/2004 | Wilson | | H04W 64/00 |
| | | | | 455/433 |
| 2005/0013426 A1 | 1/2005 | Ooki | | |
| 2006/0095283 A1* | 5/2006 | Matsumoto | | G06Q 40/04 |
| | | | | 705/1.1 |
| 2006/0136828 A1 | 6/2006 | Asano | | |
| 2006/0233341 A1* | 10/2006 | Watanabe | | H04L 67/28 |
| | | | | 379/211.02 |
| 2007/0162604 A1* | 7/2007 | Murakami | | G06Q 40/00 |
| | | | | 709/226 |
| 2008/0141274 A1* | 6/2008 | Bhogal | | G06F 9/541 |
| | | | | 719/313 |
| 2009/0174821 A1* | 7/2009 | Matsuo | | H04L 12/2805 |
| | | | | 348/725 |
| 2010/0056272 A1* | 3/2010 | Dutilly | | G06F 1/329 |
| | | | | 463/30 |
| 2012/0072849 A1 | 3/2012 | Hakoda | | |
| 2012/0239830 A1* | 9/2012 | Sugimura | | G06F 3/14 |
| | | | | 710/29 |
| 2013/0111023 A1* | 5/2013 | Lim | | H04N 21/4122 |
| | | | | 709/224 |
| 2014/0040259 A1* | 2/2014 | Takematsu | | G06F 16/284 |
| | | | | 707/736 |
| 2015/0113553 A1* | 4/2015 | Pan | | H04N 21/42219 |
| | | | | 725/32 |
| 2016/0080888 A1* | 3/2016 | Kreitzer | | H04B 1/385 |
| | | | | 455/39 |
| 2016/0087980 A1* | 3/2016 | Heo | | H04W 4/48 |
| | | | | 726/4 |

FOREIGN PATENT DOCUMENTS

| | | |
|---|---|---|
| JP | 2006-172193 | 6/2006 |
| JP | 2008-129856 | 6/2008 |
| JP | 2015-049770 | 3/2015 |
| WO | 2011/118122 A1 | 9/2011 |

* cited by examiner

FIG.3A

```
DEVICE/APPLICATION INFORMATION

DEVICE NAME: ADDRESS, ···
     ·APPLICATION NAME: IN {DATA TYPE, ···}, OUT {DATA TYPE, ···}
     ·APPLICATION NAME: IN {DATA TYPE, ···}, OUT {DATA TYPE, ···}
     · ···
```

FIG.3B

```
DEVICE/APPLICATION INFORMATION smartphone-A: 12.34.56.100
     ·Camera: OUT {image}
     ·Memo: OUT {text}
```

FIG.4A

```
DEVICE/APPLICATION MANAGEMENT INFORMATION

·DEVICE NAME: ADDRESS, ···
        ·APPLICATION NAME: IN {DATA TYPE, ···}, OUT {DATA TYPE, ···}
        ·APPLICATION NAME: IN {DATA TYPE, ···}, OUT {DATA TYPE, ···}
        · ···
·DEVICE NAME: ADDRESS, ···
        ···
```

FIG.4B

```
DEVICE/APPLICATION MANAGEMENT INFORMATION

·smartphone-A: 12.34.56.100
        ·Camera: OUT {image}
        ·Memo: OUT {text}
·digital-camera: 12.34.56.101
        ·Controller: OUT {image}
·printer: 12.34.56.102
        ·Controller: IN {text, image}
```

FIG.5A

```
LINKAGE MANAGEMENT INFORMATION

·LINKAGE ID
      ·LINKAGE SOURCE={DEVICE NAME, APPLICATION NAME}
      ·LINKAGE DESTINATION=[{DEVICE NAME, APPLICATION NAME},
      {DEVICE NAME, APPLICATION NAME}, ···]
·LINKAGE ID
      ·LINKAGE SOURCE={DEVICE NAME, APPLICATION NAME}
      ·LINKAGE DESTINATION=[{DEVICE NAME, APPLICATION NAME},
      {DEVICE NAME, APPLICATION NAME}, ···]
...
```

FIG.5B

```
LINKAGE MANAGEMENT INFORMATION

·coop-1
      ·LINKAGE SOURCE={tablet-A, Report}
      ·LINKAGE DESTINATION=[{smartphone-A, Camera},
      {digital-Camera, Controller}]
```

INFORMATION PROCESSING SYSTEM, INFORMATION PROCESSING DEVICE, INFORMATION PROCESSING METHOD, AND COMPUTER-READABLE RECORDING MEDIUM

CROSS-REFERENCE TO RELATED APPLICATION

This application is based upon and claims the benefit of priority of the prior Japanese Patent Application No. 2016-024190, filed on Feb. 10, 2016, the entire contents of which are incorporated herein by reference.

FIELD

The embodiments discussed herein are related to an information processing system, an information processing device, an information processing method, and a computer-readable recording medium.

BACKGROUND

There is a technology in which a terminal that a user is using does not reproduce Web contents or the like but a peripherally-located device reproduces the Web contents. For example, a user selects a device suitable for reproduction from among devices located around the user in accordance with a type or a format of contents such as images or voices, and transfers contents to the selected device to reproduce the contents.

Furthermore, there is a technology that enables a keyboard or a mouse of a personal computer (PC) that a user is using to perform an operation such as text input into an application on a peripherally-located device such as a mobile terminal. In this case, for example, it is preferable to perform an operation for associating the PC with the mobile terminal connected to Wi-Fi (Wireless Fidelity: registered trademark), Bluetooth (registered trademark), or the like. For that reason, prior to a linkage, the user selects a target device from among a connection device list or inputs an IP (Internet Protocol) address of a mobile terminal into the PC to associate the PC with the mobile terminal.

[Patent Literature 1] Japanese Laid-open Patent Publication No. 2015-049770

However, in the conventional technology, because one application is linkable from among applications that are being executed on a terminal that a user is using, there is a problem that the selection of a situational optimum device is difficult when the number of peripheral devices that are able to execute the one application is two or more.

For example, in Patent Literature 1, when a peripherally-located device reproduces contents, only one linkage destination is presented to a user even when the number of usable devices is two or more. However, the determination of which device of the plurality of devices is most suitable for reproduction depends on the situation. For example, when viewing moving images, there may be a situation in which contents are displayed on a large-screen display to appreciate the contents slowly and carefully, or a situation in which contents are displayed on a mobile terminal to view the contents lightly. Therefore, as in Patent Literature 1, because a user is not able to use a suitable device even if the suitable device exists depending on the current situation if the number of linkage destinations to be presented to the user is one, a situational optimum device is not selected.

On the other hand, even in the conventional technology in which a mobile terminal connected to Wi-Fi (registered trademark) is associated with PC, for example, there is a technique for presenting a list of connectable devices to a user. In this case, the user however performs an operation for selecting a device from the list prior to the association. However, because the association is not performed at the point of selection, actual operations of devices are not confirmed and compared. Therefore, the more the number of devices to be selected especially increases, the more difficult the selection of a situational optimum device is.

SUMMARY

According to an aspect of an embodiment, an information processing system includes a linkage-source device, a plurality of linkage-destination devices that is connectable to the linkage-source device, and an application linkage device that controls linkages of applications respectively registered in the linkage-source device and the plurality of linkage-destination devices. The application linkage device includes a first managing unit that manages device information including information used to be connected with a linkage-destination device and information on data to be used by the application registered in a relevant linkage-destination device, a second managing unit that acquires linkage candidates indicative of linkable linkage-destination devices and the linkable applications registered in relevant linkage-destination devices with reference to the device information managed by the first managing unit with respect to a linkage request from the application of the linkage-source device, and a linkage controller that activates the applications indicated as the linkage candidates and decides a device performing the linkage and a linkable application registered in the relevant device as a linkage destination from the linkage candidates.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A is a diagram illustrating the configuration of device/application information;

FIG. 3B is a diagram illustrating an example of the device/application information;

FIG. 4A is a diagram illustrating the configuration of device/application management information;

FIG. 4B is a diagram illustrating an example of the device/application management information;

FIG. 5A is a diagram illustrating the configuration of linkage management information;

FIG. 5B is a diagram illustrating an example of the linkage management information;

DESCRIPTION OF EMBODIMENTS

Preferred embodiments of the present invention will be explained with reference to accompanying drawings. In the embodiments, an application linkage control system is explained as an example of an information processing system. Moreover, the present invention is not limited to the embodiments described below.

[a] First Embodiment

Configuration of Application Linkage Control System

Figure 1:
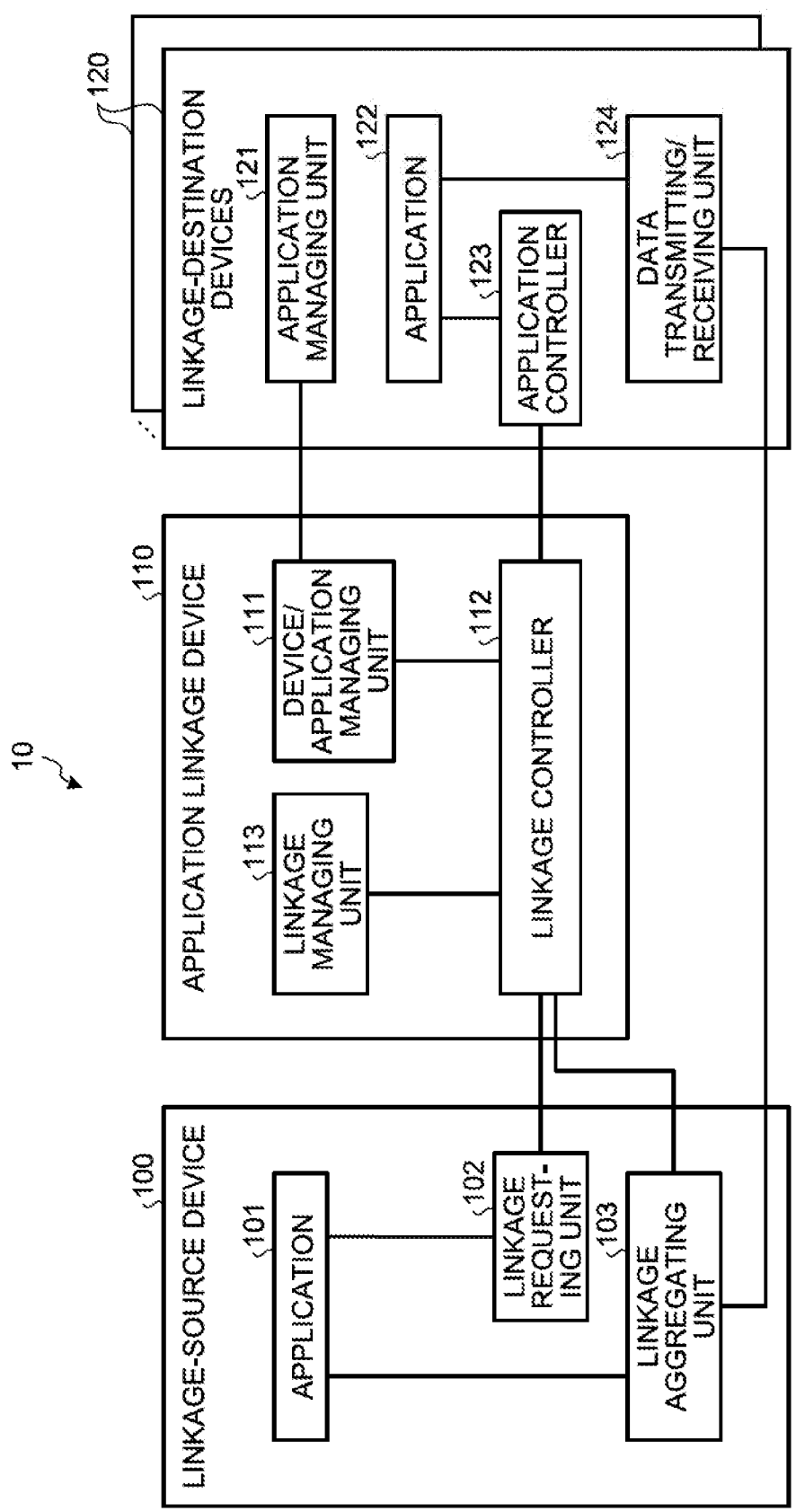
FIG. 1 is a diagram illustrating the configuration of an application linkage control system according to a first embodiment.

FIG. 1 is a diagram illustrating the configuration of an application linkage control system 10 according to the first embodiment. The application linkage control system 10 includes a linkage-source device 100, an application linkage device 110, and a plurality of linkage-destination devices 120. The application linkage device 110 is connected to the linkage-source device 100 and the linkage-destination devices 120 by using Wi-Fi (registered trademark). However, it is only sufficient that communication between the linkage device and the source/destination devices employs a wired or wireless local area network communication method. Therefore, the communication method is not limited to Wi-Fi (registered trademark). For example, the communication method may employ wireless communication such as Bluetooth (registered trademark) and infrared communication, or may employ wire transmission such as USB (Universal Serial Bus).

Figure 2:
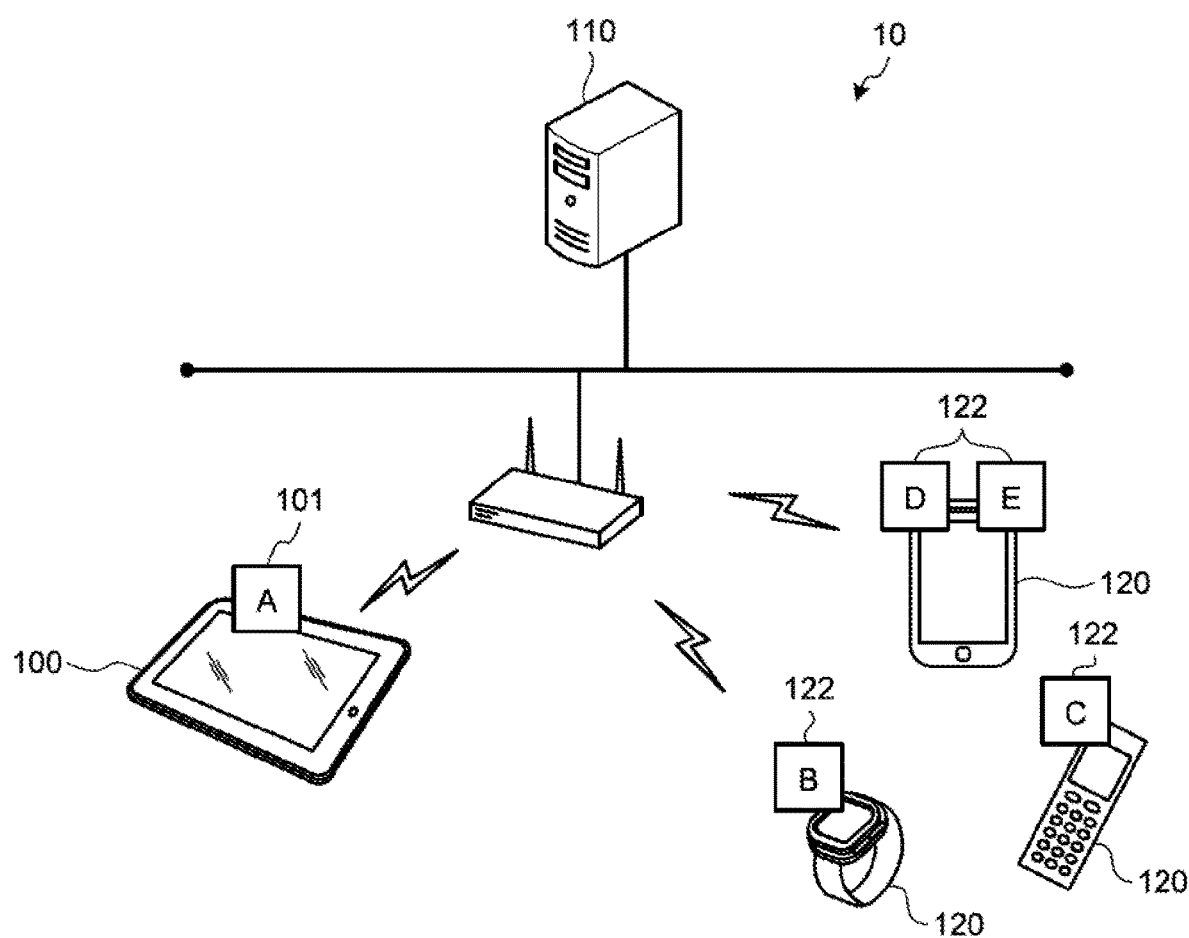
FIG. 2 is a diagram illustrating an example of the application linkage control system according to the first embodiment.

FIG. 2 is a diagram illustrating an example of the application linkage control system according to the first embodiment. As the linkage-source device 100 handled by a user, a tablet terminal on which an application A101 operates is illustrated in FIG. 2. However, the linkage-source device is not limited to this. As the application linkage device 110, a PC server is illustrated in FIG. 2. However, the application linkage device is not limited to this. As the linkage-destination device 120, a smart watch on which an application B122 operates is illustrated in FIG. 2. A handheld code reader on which an application C122 operates is illustrated. A smartphone on which an application D122 and an application E122 operate is illustrated. However, the linkage-destination device 120 is not limited to these. For example, the linkage-destination device may be configured by connecting smartphones. Alternatively, the linkage-destination device may be a camera, a speaker, or a printer, for example, if it is a device connectable to the application linkage device 110.

As illustrated in FIG. 2, a linkage request with another device transmitted from the application A101 that the user is using is received by the application linkage device 110. The application linkage device 110 is connected to peripheral devices, and manages the applications B122 to E122 that operate on the respective peripheral devices. The application linkage device 110, with respect to a linkage request from the application A101, intermediates to link with an appropriate application among the applications operating on the connected peripheral devices. For example, when transmitting a linkage request for reproducing music data from the application A101 operating on the tablet terminal, the PC server receives this linkage request. The PC server that has received the linkage request activates the applications B122 and D122 of the smart watch and the smartphone as devices that satisfy the linkage request among the peripheral devices, and transmits music data to these applications. Herein, the applications B122 and D122 are an application that is able to reproduce music data. A user is able to handle the activated applications of the smart watch and the smartphone to reproduce the received music data. Then, after comparing both, the user is able to decide an appropriate device for reproduction of music data among the smart watch and the smartphone.

Returning to FIG. 1, constituent elements of the application linkage control system according to the first embodiment will be explained. The linkage-source device 100 includes an application 101, a linkage requesting unit 102, and a linkage aggregating unit 103. The application 101 is able to be registered two or more. However, in the present embodiment, for the sake of convenience, it is assumed that one application handled by the user is operating. As an example, the application 101 is a Web browser, a word processor, a communication type game, or the like.

The linkage requesting unit 102 transmits a linkage request of the application 101 for the linkage-destination device 120 to the application linkage device 110. Moreover, the detailed description of the linkage requesting unit 102 will be described below.

The linkage aggregating unit 103 presents the user with data received from the application of the linkage-destination device 120. Then, when the user decides a linkage destination, the linkage aggregating unit 103 notifies the application linkage device 110 of the decision of the linkage destination with reference to the presented data and the like. Moreover, the detailed description of the linkage aggregating unit 103 will be described below.

The application linkage device 110 includes a device/application managing unit 111, a linkage controller 112, and a linkage managing unit 113. The device/application managing unit 111 receives device/application information from the linkage-destination device 120, and registers the received device/application information in device/application management information. Herein, the device/application information is information that includes information needed to establish a connection with the linkage-destination device 120 and information on data treated by the applications registered in the linkage-destination devices 120. Moreover, the device/application management information is obtained by aggregating the device/application information on the plurality of peripheral linkage-destination devices 120. The device/application management information is registered in a storage that is not illustrated. Moreover, the detailed description of the device/application managing unit 111 will be described below.

When receiving the linkage request from the linkage-source device 100, the linkage controller 112 seeks linkage candidates with reference to the device/application management information and activates all corresponding applications on the linkage candidates. Moreover, when receiving the decision of the linkage destination from the linkage-source device 100, the linkage controller 112 stops applications that are operating on devices other than the decided linkage-destination device 120 among the linkage-destination devices 120 of the linkage candidates. Moreover, the detailed description of the linkage controller 112 will be described below.

The linkage managing unit 113 associates the linkage-destination device 120 of the linkage candidate with respect to the linkage request from the linkage-source device 100 with the application on the linkage-destination device 120, and registers the association information as linkage management information. The detailed description of the linkage management information will be described below.

The configuration of the device/application information received by the device/application managing unit 111 will be explained with reference to FIGS. 3A and 3B. FIG. 3A is a diagram illustrating the configuration of the device/application information. FIG. 3B is a diagram illustrating an example of the device/application information. As illustrated in FIG. 3A, the device/application information on the linkage-destination device 120 includes information needed for communication, such as a device name, an address of a device, and an identifier. Moreover, the device/application information includes a data type of input (IN) and output (OUT) data capable of being processed by each application included in a device.

As illustrated in FIG. 3B, "smartphone-A" is set as a target device. The address of the target device is set to "12.34.56.100". Moreover, applications mounted on the target device are set to "Camera" and "Memo". In FIG. 3B, data output from "Camera" is "image", and data output from "Memo" is "text".

The configuration of the device/application management information that is registered in the device/application managing unit 111 will be explained with reference to FIGS. 4A and 4B. FIG. 4A is a diagram illustrating the configuration of the device/application management information. FIG. 4B is a diagram illustrating an example of the device/application management information. As illustrated in FIG. 4A, the device/application information sent from the plurality of linkage-destination devices 120 is set. Because the data structure of each of the linkage-destination devices 120 is similar to that of FIG. 3A, their descriptions are omitted.

As illustrated in FIG. 4B, the device/application management information further includes information on two devices in addition to smartphone-A of FIG. 3B. Herein, "digital-camera" is set as a first target device. The address of the target device is set to "12.34.56.101". Moreover, an application mounted on the target device is set to "Controller". It is illustrated that data output from "Controller" is "image". Herein, "printer" is set as a second target device. The address of the target device is set to "12.34.56.102". Moreover, an application mounted on the target device is set to "Controller". It is illustrated that data to be input into "Controller" is "text" and "image".

The configuration of the linkage management information that is registered in the linkage managing unit 113 will be explained with reference to FIGS. 5A and 5B. FIG. 5A is a diagram illustrating the configuration of the linkage management information. FIG. 5B is a diagram illustrating an example of the linkage management information. As illustrated in FIG. 5A, the linkage management information associates a linkage source and a linkage destination with a linkage ID. The linkage ID is an identifier assigned to a linkage request. The linkage ID is assigned by the linkage controller 112. The linkage source indicates a device name and an application name of the linkage-source device 100 that sends the linkage request. The linkage destination indicates a combination of a device name and an application name of the linkage-destination device 120 that becomes a linkage candidate.

As illustrated in FIG. 5B, when the linkage ID is "coop-1", "tablet-A" and "Report" are respectively set as the device name and application name of the linkage-source device 100 for the linkage source. For the linkage destination, "smartphone-A" and "Camera" are respectively set as the device name and application name of the linkage-destination device 120 that becomes a linkage candidate. Moreover, "digital-camera" and "Controller" are respectively set as the device name and application name of the linkage-destination device 120 that becomes a linkage candidate.

Returning to FIG. 1, the linkage-destination device 120 includes an application managing unit 121, an application 122, an application controller 123, and a data transmitting/receiving unit 124. When detecting the application linkage device 110, the application managing unit 121 is connected to the application linkage device 110 to transmit its own device/application information. Moreover, the detailed description of the application managing unit 121 will be described below.

The application 122 is an application that is registered in the linkage-destination device 120. The application 122 performs transmission and reception of data in accordance with a user's operation. The application 122 is able to be registered two or more.

The application controller 123 activates the application 122 upon receiving an activation request from the application linkage device 110. Moreover, upon receiving stoppage notification, the application controller 123 stops the application 122. The detailed description of the application controller 123 will be described below.

The data transmitting/receiving unit 124 transmits and receives input-output data of the application 122 to and from the linkage-source device 100. The detailed description of the data transmitting/receiving unit 124 will be described below.

Although it is not illustrated in FIG. 1, the linkage-source device 100 may include a configuration corresponding to the application managing unit 121 of the linkage-destination device 120. In other words, when detecting the application linkage device 110, the corresponding function part of the linkage-source device 100 is connected to the application linkage device 110 to transmit the device/application information of the linkage-source device 100.

Sequence of Registration of Device/Application Management Information

Figure 6:
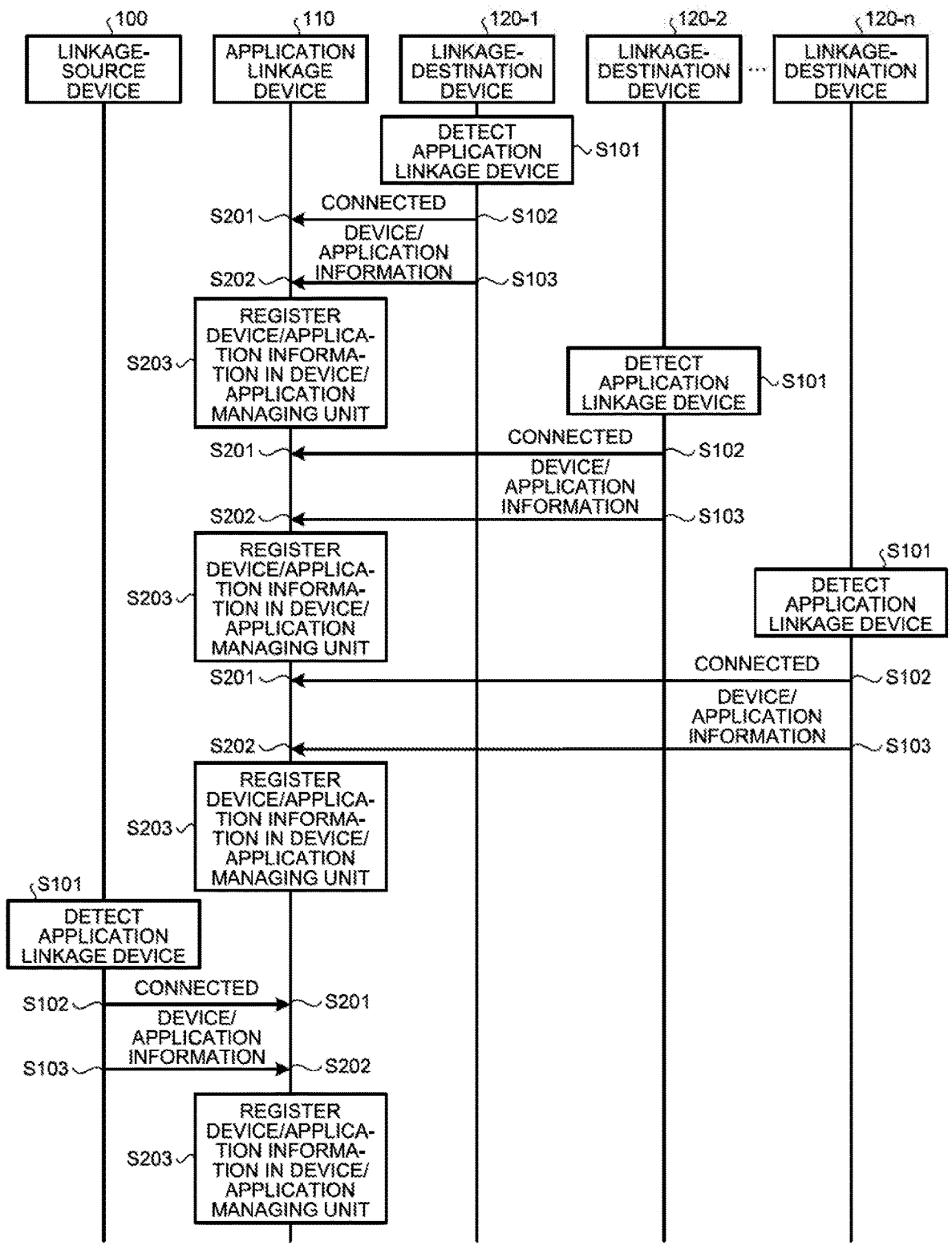
FIG. 6 is a diagram illustrating an example of a sequence of registration of the device/application management information according to the first embodiment.

Next, the sequence of registration of the device/application management information according to the first embodiment will be explained with reference to FIG. 6. FIG. 6 is a diagram illustrating an example of the sequence of registration of the device/application management information according to the first embodiment.

As illustrated in FIG. 6, the application linkage control system 10 has a configuration that includes a plurality of linkage-destination devices 120-1, 120-2, . . . , and 120-n with respect to one linkage-source device and one application linkage device.

First, each of the linkage-destination devices 120-1, 120-2, . . . , and 120-n that are located around the application linkage device 110 detects the application linkage device 110 and is connected to the application linkage device 110 to transmits device/application information (Steps S101 to S103). Whenever receiving the device/application information, the application linkage device 110 registers the received device/application information in the device/application managing unit 111 (Steps S201 to S203). As described above, the application linkage device 110 generates the device/application management information obtained by aggregating the device/application information of the plurality of linkage-destination devices 120.

Furthermore, the linkage-source device 100 detects the application linkage device 110 and is connected to the application linkage device 110 to transmit device/application information (Steps S101 to S103). Upon receiving the device/application information, the application linkage device 110 registers the received device/application information in the device/application managing unit 111 (Steps S201 to S203).

In FIG. 6, the application linkage device 110 performs registration of the device/application management information after registration of the device/application management information of the linkage-destination device 120. However, the present embodiment is not limited to this. In other words, the application linkage device 110 may perform the registration of the device/application management information of the linkage-source device 100 before the registration of the linkage-destination device 120 or between the registrations of the plurality of linkage-destination devices 120. Moreover, when the application linkage device 110 previously saves the device/application management information of the linkage-source device 100, the linkage-source device 100 does not transmit its own device/application information.

Figure 7:
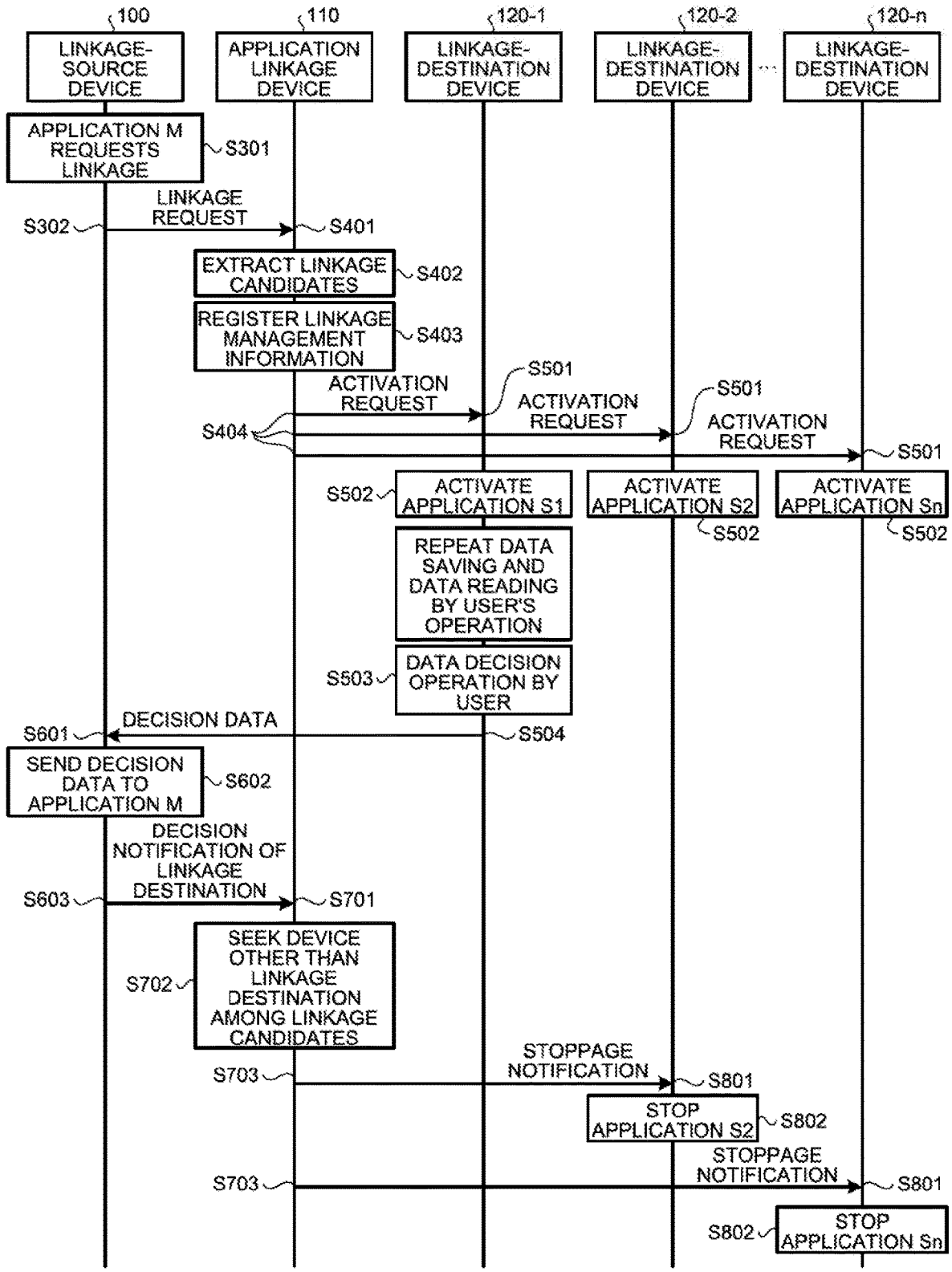
FIG. 7 is a diagram illustrating an example of a sequence in which an application of a linkage-source device links with an application of a linkage-destination device according to the first embodiment.

Linkage Sequence of Application of Linkage-Source Device and Application of Linkage-Destination Device Next, a sequence in which the application of the linkage-source device and the application of the linkage-destination device link with each other according to the first embodiment will be explained with reference to FIG. 7. FIG. 7 is a diagram illustrating an example of a sequence in which the application of the linkage-source device links with the application of the linkage-destination device according to the first embodiment.

As illustrated in FIG. 7, a linkage request is first transmitted to another device from an application M operating on the linkage-source device 100 that the user is using (Steps S301 to S302). When receiving the linkage request, the application linkage device 110 extracts, as a linkage candidate, a set of a device and an application adapted to the linkage request from the device/application management information, and registers the extracted set as the linkage management information (Steps S401 to S403). Then, the application linkage device 110 requests each of the linkage-destination devices 120 as a linkage candidate to activate the corresponding application (Step S404). In FIG. 7, the application linkage device 110 requests the linkage-destination devices 120-1, 120-2, . . . , and 120-n to respectively activate applications S1, S2, . . . , and Sn.

Each of the linkage-destination devices 120-1, 120-2, and 120-n receives an activation request (Step S501) and activates the requested application (Step S502). Herein, when a plurality of applications is activated in response to the linkage request from the application M, the user decides an application of a device that fits the situation among these applications (Step S503). In FIG. 7, the user uses the application S1 of the linkage-destination device 120-1 to perform data saving, data reading, and the like in accordance with a user's operation, and decides the application S1 of the linkage-destination device 120-1. Although it is not illustrated in FIG. 7, the user may use the plurality of linkage-destination devices 120. Therefore, the user can compare the usability between the applications of the linkage-destination devices with respect to the same user's operation, and then decide the application of the linkage-destination device.

In this way, the user decides an application that fits the situation among the plurality of applications activated in response to the linkage request, and notifies the linkage-source device 100 of the decided application (Step S504). In FIG. 7, notification decided as a linkage destination is transmitted from the linkage-destination device 120-1. The linkage-source device 100 that receives the notification notifies the application M of the decided linkage-destination device 120, and transmits the decision notification of the linkage destination to the application linkage device 110 (Steps S601 to S603).

Upon receiving the decision notification of the linkage destination, the application linkage device 110 transmits application stoppage notification to the linkage-destination devices 120 of linkage candidates excluding the decided device and application among the linkage candidates with respect to the linkage request (Steps S701 to S703). The linkage-destination devices 120 that receive the notification stop the corresponding applications (Step S801 to Step S802). In FIG. 7, the linkage-destination devices 120-2, . . . , and 120-n that are not decided receive the stoppage notification to respectively stop the applications S2, . . . , and Sn.

In FIG. 7, only the linkage-destination device 120-1 is decided as a linkage destination in response to the linkage request. However, the plurality of linkage-destination devices 120 may be decided as a linkage destination. For example, when the linkage-destination devices 120-1 and 120-2 are decided as a linkage destination, the application stoppage notification is transmitted to the linkage-destination devices 120-3 to 120-n that are not illustrated.

Figure 8:
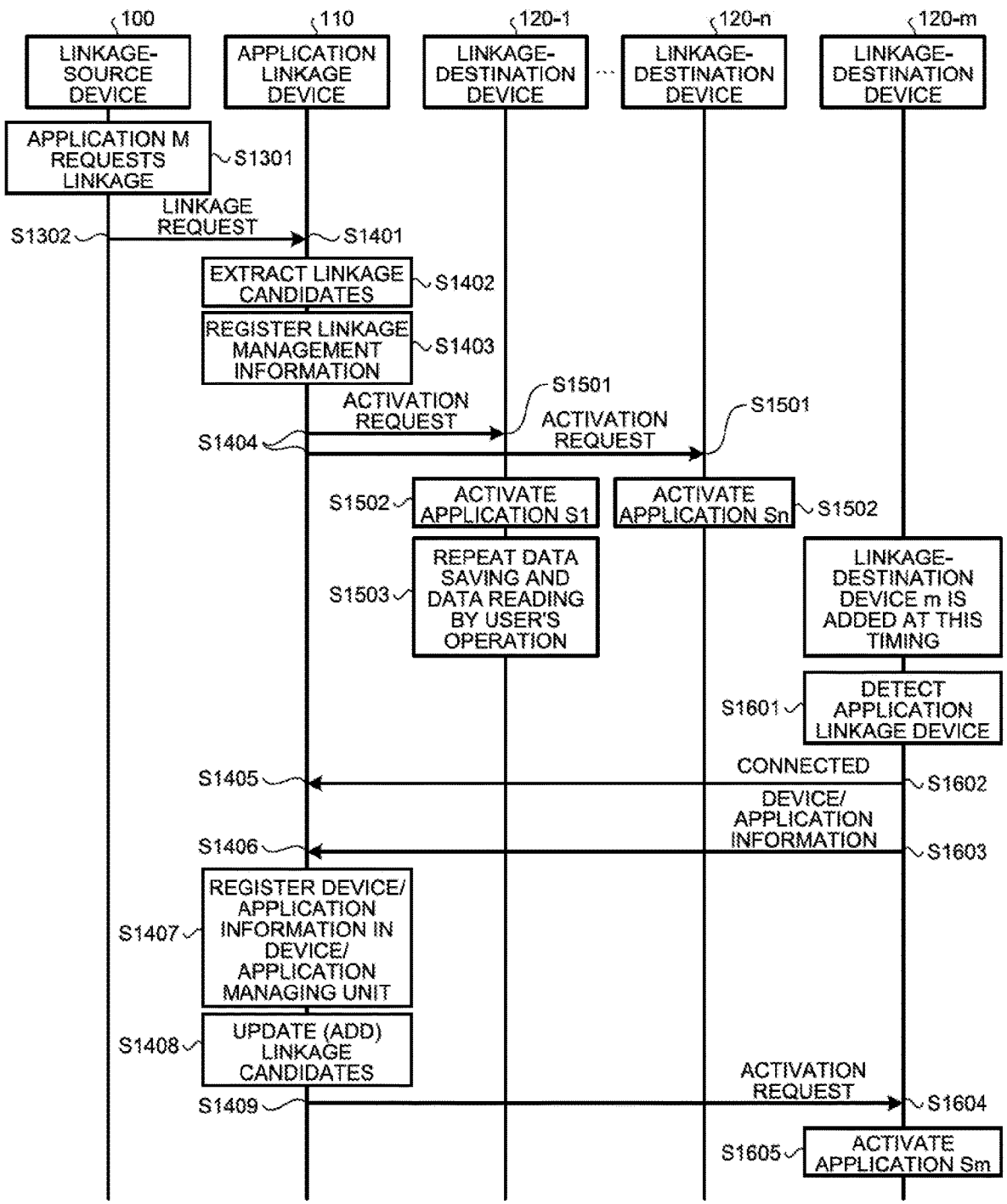
FIG. 8 is a diagram illustrating an example of a sequence of registration of device/application information and application activation of a newly-added linkage-destination device according to the first embodiment.

Sequence of Registration of Device/Application Information and Application Activation of Newly-Added Linkage-Destination Device FIG. 8 is a diagram illustrating an example of a sequence of registration of device/application information and application activation of a newly-added linkage-destination device according to the first embodiment. Hereinafter, when a linkage-destination device 120-m is newly added to the application linkage control system 10 of FIGS. 6 and 7, a sequence of registration of device/application information and application activation of the added linkage-destination device 120-m will be explained with reference to FIG. 8.

In FIG. 8, it is assumed that the application linkage device 110 already registers the device/application information of the linkage-destination devices 120-1, . . . , and 120-n in the device/application management information. First, the linkage-source device 100 transmits a linkage request to the application linkage device 110 (Steps S1301 to S1302). Next, when receiving the linkage request, the application linkage device 110 extracts, as a linkage candidate, a set of a device and an application adapted to the linkage request from the device/application management information, and registers the extracted set as linkage management information (Steps S1401 to S1403). Then, the application linkage device 110 requests each of the linkage-destination devices 120, which becomes a linkage candidate, to activate the corresponding application (Step S1404).

Each of the linkage-destination devices 120-1, 120-2, . . . , and 120-n receives an activation request (Step S1501) and activates the requested application (Step S1502). The user uses an application of the device that fits the situation (Step S1503).

Herein, it is assumed that the linkage-destination device 120-m is added at a time before the linkage-destination device 120 with respect to the linkage request is decided. Then, the added linkage-destination device 120-m detects the application linkage device 110 and is connected to the application linkage device 110 to transmit the device/application information (Steps S1601 to S1603). The application linkage device 110 registers the received device/application information of the linkage-destination device 120-m in the device/application management information (Steps S1405 to S1407). Then, when the added device/application information includes a device and an application adapted to the linkage request, the application linkage device 110 adds a set of the device and application to the linkage candidates to update the linkage candidates, and requests the new linkage candidate to activate the application (Steps S1408 to S1409). In FIG. 8, the linkage-destination device 120-m is added to the linkage candidates, and receives the activation request of the application to activate an application Sm (Steps S1604 and S1605).

Figure 9:
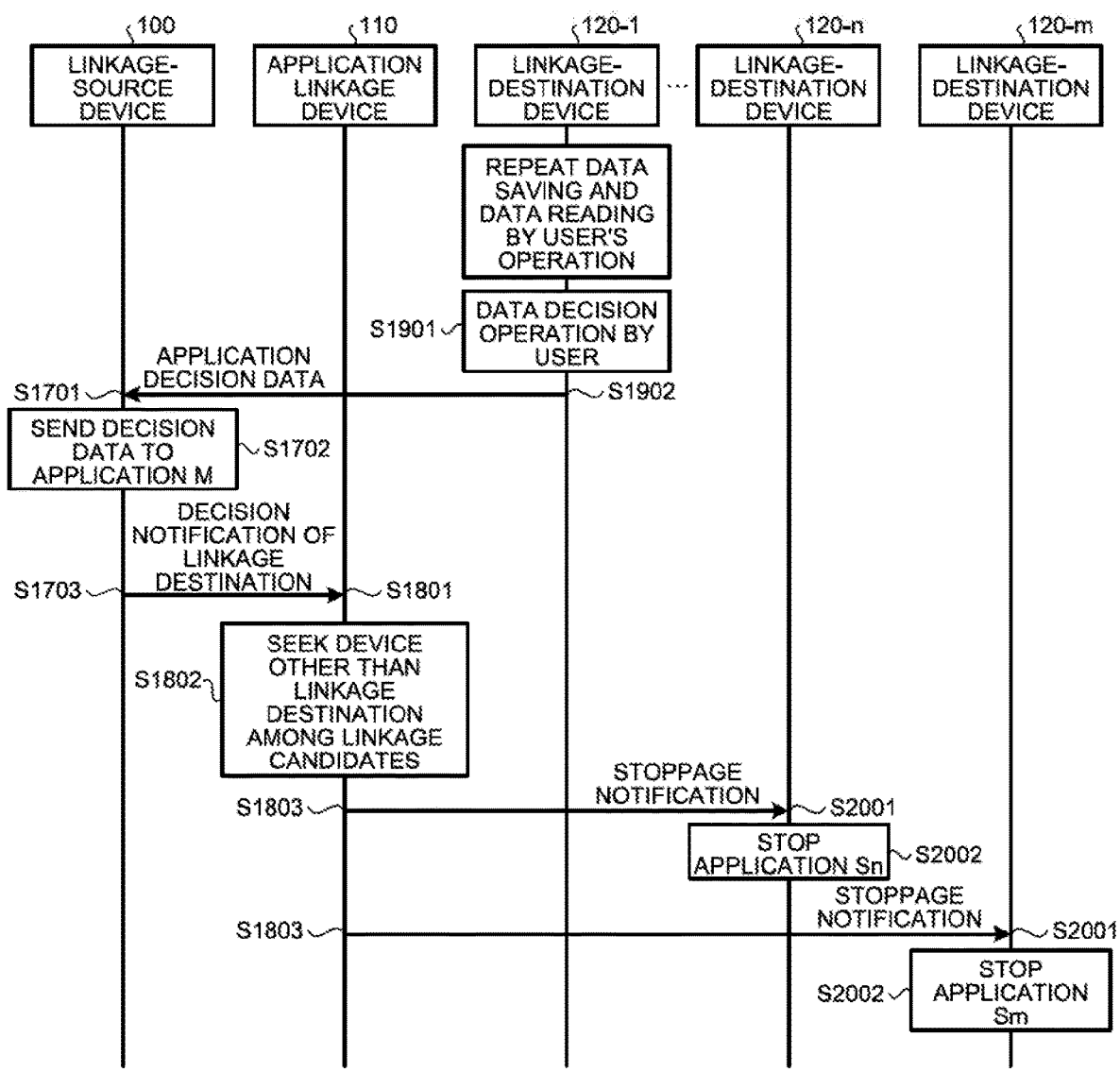
FIG. 9 is a diagram illustrating an example of a sequence in which applications of linkage-destination devices including the newly-added linkage-destination device link with the application of the linkage-source device according to the first embodiment.

Linkage Sequence of Application of Linkage-Source Device and Applications of Linkage-Destination Devices Including Newly-Added Linkage-Destination Device FIG. 9 is a diagram illustrating an example of a sequence in which applications of linkage-destination devices including a newly-added linkage-destination device link with the application of the linkage-source device according to the first embodiment. A case where the linkage-destination device 120-m is newly added to the application linkage control system 10 of FIGS. 6 and 7 will be explained below. More specifically, after requesting registration of device/application information and application activation of the newly-added linkage-destination device in FIG. 8, a sequence in which the applications of the linkage-destination devices including the newly-added linkage-destination device link with the application of the linkage-source device will be explained in FIG. 9.

The user decides the application of the linkage-destination device 120 that fits the situation among the applications including the application Sm of the newly-added linkage-destination device 120-m, which are activated in response to the linkage request from the application M of the linkage-source device 100. Herein, when the plurality of applications is activated in response to the linkage request from the application M, the user decides the application of a device that fits the situation among these applications (Steps S1901 and S1902). In FIG. 9, the user uses the application S1 of the linkage-destination device 120-1 to perform data saving, data reading, and the like in accordance with a user's operation, and decides the application S1 of the linkage-destination device 120-1. Although it is not illustrated in FIG. 9, the user may use the application Sm of the linkage-destination device 120-m. Therefore, the user can compare the usability between the applications of the linkage-destination devices with respect to the same user's operation and decide the application of the linkage-destination device.

In this way, even if the linkage-destination device 120-m is newly added after the linkage request is received from the linkage-source device 100, the user can decide an application that fits the situation among applications including the application of the newly-added linkage-destination device. In FIG. 9, notification decided as a linkage destination is transmitted from the linkage-destination device 120-1. The linkage-source device 100 that receives the notification notifies the application M of the decided linkage-destination device 120, and transmits the decision notification of the linkage destination to the application linkage device 110 (Steps S1701 to S1703).

Upon receiving the decision notification of the linkage destination, the application linkage device 110 transmits the application stoppage notification to the linkage-destination devices 120 of the linkage candidates excluding the decided device and application among the linkage candidates with respect to the linkage request (Steps S1801 to S1803). The linkage-destination devices 120 that receive the notification stop the applications (Steps S2001 to S2002). In FIG. 9, the linkage-destination devices 120-n and 120-m that are not decided receive the stoppage notification to respectively stop the applications Sn and Sm.

Although it is not illustrated in the sequences of FIGS. 6 to 9, it is considered that the linkage-source device 100 is disconnect from the application linkage device 110 due to physical movement of the linkage-destination device 120 that currently links with the application of the linkage-source device 100, shutdown of power supply, or the like. Also in this case, if the application linkage device 110 is controlled as described below for example, the linkage-source device 100 can link with the appropriate linkage-destination device 120.

First, the application of the linkage-source device 100 detects the vanishment of the linkage-destination device 120, and notifies the application linkage device 110 of a second linkage request and the vanishment of the linkage destination. The application linkage device 110 deletes the device/application information on the vanished linkage-destination device 120 from the device/application management information, and then extracts linkage candidates with respect to the second linkage request and requests the linkage-destination devices 120 that become a candidate to activate the corresponding applications. Hereinafter, it is possible to decide a new linkage destination from the linkage candidates in the same procedure as that of FIG. 9.

Although it does not currently link with the application of the linkage-source device 100, it is considered that the linkage-destination device 120 connected to the application linkage device 110 is vanished. In this case, it is only sufficient that the application linkage device 110 regularly confirms connection with the linkage-destination device 120 to detect its vanishment and deletes the device/application information on the vanished linkage-destination device 120 from the device/application management information. As a result, when there is a linkage request subsequently, the application linkage device 110 can extract appropriate linkage candidates.

Hereinafter, processing procedures of the devices that constitute the application linkage control system 10 in the sequences explained in FIGS. 6 to 9 will be individually explained with reference to FIGS. 10 to 19.

Figure 10:
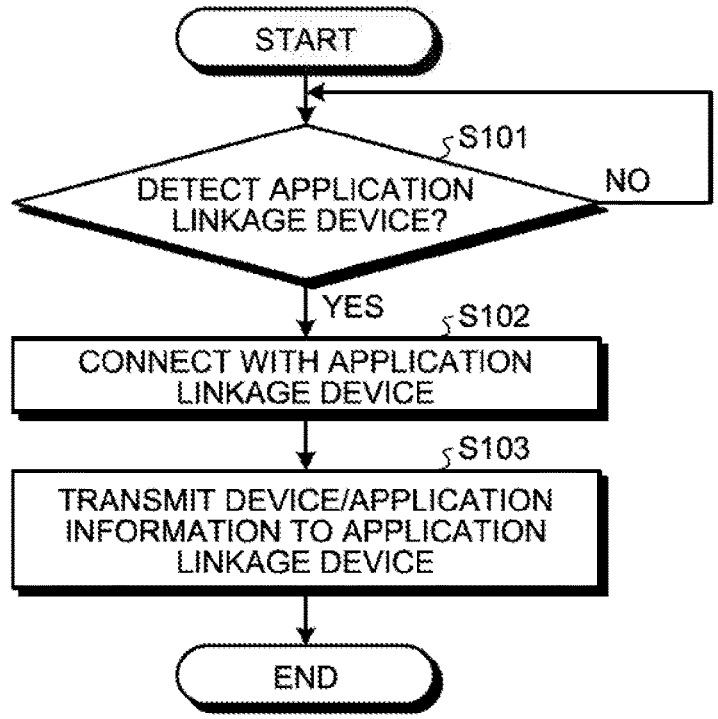
FIG. 10 is a diagram illustrating an example of a flowchart in which linkage-source/linkage-destination devices transmit device/application information according to the first embodiment.

Flowchart of Transmission of Device/Application Information by Linkage-Source/Linkage-Destination Devices FIG. 10 is a diagram illustrating an example of a flowchart in which the linkage-source device 100 and the linkage-destination devices 120 transmit device/application information according to the first embodiment.

First, the linkage-source device 100 or the application managing unit 121 of the linkage-destination device 120 determines whether it detects the application linkage device 110 (Step S101). When the application linkage device 110 is not detected (Step S101: No), the determination process is continued until the application linkage device 110 is detected. When the application linkage device 110 is detected (Step S101: Yes), the linkage-source device 100 or the application managing unit 121 of the linkage-destination device 120 establishes the connection with the detected application linkage device 110 (Step S102). Then, the linkage-source device 100 or the application managing unit 121 of the linkage-destination device 120 transmits the device/application information as illustrated in FIGS. 3A and 3B to the application linkage device 110 (Step S103).

Figure 11:
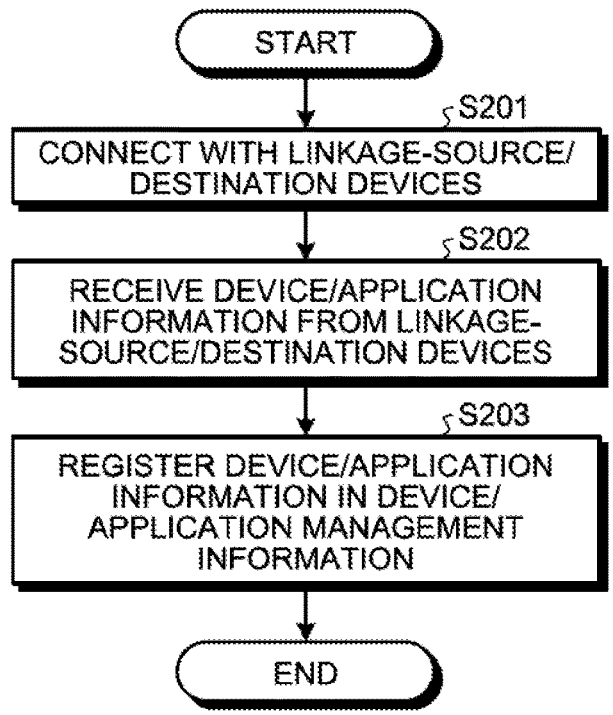
FIG. 11 is a diagram illustrating an example of a flowchart in which an application linkage device registers the device/application information according to the first embodiment.

Flowchart of Registration of Device/Application Information by Application Linkage Device FIG. 11 is a diagram illustrating an example of a flowchart in which the application linkage device registers the device/application information according to the first embodiment.

First, the device/application managing unit 111 of the application linkage device 110 is connected to the linkage-source device 100 or the linkage-destination device 120 (Step S201), and receives the device/application information from the linkage-source device 100 or the linkage-destination device 120 (Step S202). The device/application managing unit 111 registers the received device/application information in a storage that is not illustrated, and stores the registered information as the device/application management information as illustrated in FIGS. 4A and 4B (Step S203).

Flowchart of Transmission of Linkage Request by Linkage-Source Device

Figure 12:
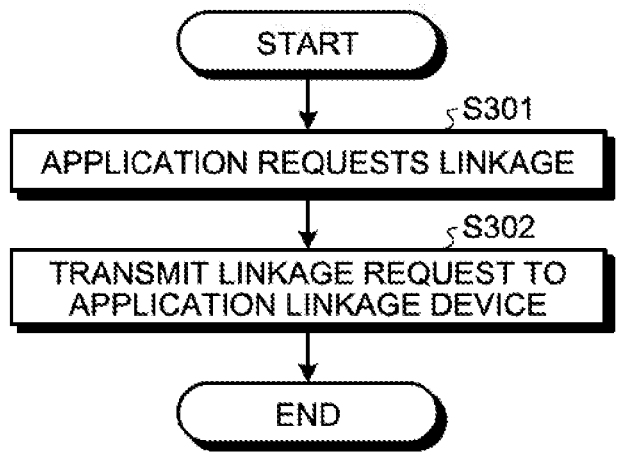
FIG. 12 is a diagram illustrating an example of a flowchart in which the linkage-source device transmits a linkage request according to the first embodiment.

FIG. 12 is a diagram illustrating an example of a flowchart in which the linkage-source device transmits a linkage request according to the first embodiment.

First, when the user performs a linkage operation on the application 101 of the linkage-source device 100, the application 101 notifies the linkage requesting unit 102 of a linkage request for another device (Step S301). The linkage requesting unit 102 transmits the linkage request to the application linkage device 110 (Step S302).

Figure 13:
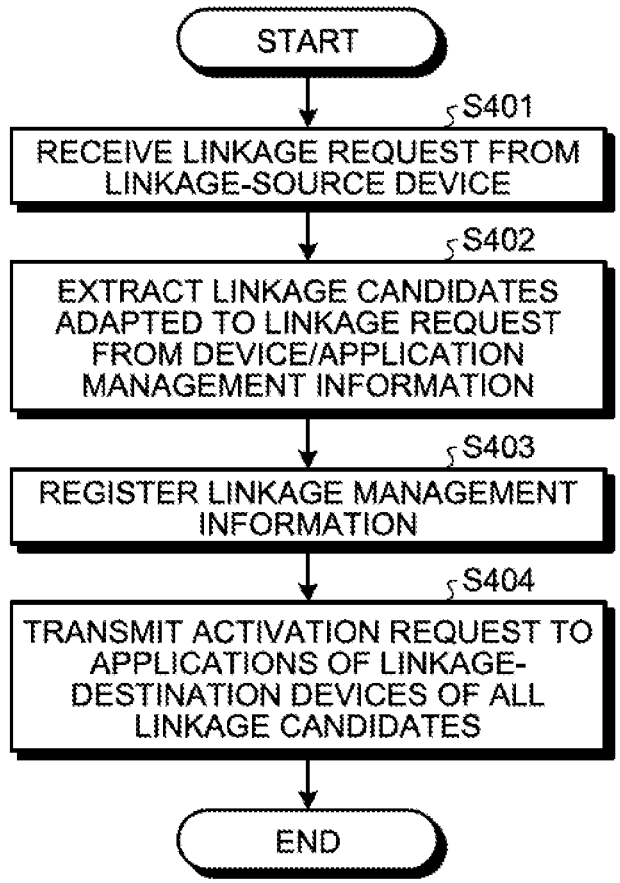
FIG. 13 is a diagram illustrating an example of a flowchart in which the application linkage device transmits an activation request to linkage candidates according to the first embodiment.

Flowchart of Transmission of Activation Request by Application Linkage Device to Linkage Candidates FIG. 13 is a diagram illustrating an example of a flowchart in which the application linkage device transmits an activation request to linkage candidates according to the first embodiment.

First, the linkage controller 112 of the application linkage device 110 receives the linkage request from the linkage-source device 100 (Step S401). The device/application managing unit 111 extracts linkage candidates adapted to the linkage request with reference to the device/application management information (Step S402). As an example, it is assumed that the linkage-source device 100 is "smartphone-A" and the linkage request from the linkage-source device 100 is a linkage request with "Camera". Then, when referring to the device/application management information of FIG. 4B, the device/application managing unit 111 extracts "Controller" of "printer" as a linkage candidate adapted to the linkage request with "Camera". In other words, the application "Camera" of "smartphone-A" outputs image data. Therefore, as the linkage-destination device 120 that inputs the output image data, "Controller" of "printer" is extracted as a linkage candidate. In such an example, although only one linkage candidate is extracted, the linkage candidate adapted to the linkage request may be extracted two or more.

Then, the device/application managing unit 111 registers the linkage candidate extracted from the linkage managing unit 113 in the linkage management information in association with the linkage source and the linkage ID assigned to the linkage request (Step S403). Furthermore, the linkage controller 112 transmits the activation request of the application to the linkage-destination device 120 of the linkage candidate (Step S404).

Figure 14:
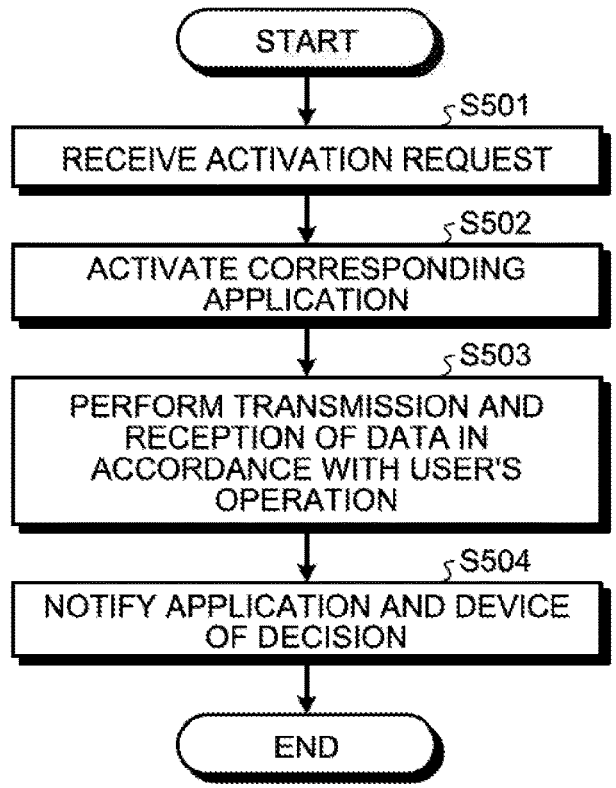
FIG. 14 is a diagram illustrating an example of a flowchart in which an application of the linkage-destination device is activated and handled by a user according to the first embodiment.

Flowchart in which Application of Linkage-Destination Device is Activated and Handled by User FIG. 14 is a diagram illustrating an example of a flowchart in which the application of the linkage-destination device is activated and handled by the user according to the first embodiment.

First, the application controller 123 of the linkage-destination device 120 receives the activation request from the application linkage device 110 (Step S501), and activates the corresponding application 122 (Step S502). Then, the data transmitting/receiving unit 124 performs transmission and reception of data by the application 122 in accordance with a user's operation (Step S503), and the user determines whether the linkage-destination device 120 in handling is appropriate to the linkage request and decides the most appropriate linkage-destination device 120. The data transmitting/receiving unit 124 notifies the activated application 122 and the linkage-source device 100 of the decision (Step S504).

Figure 15:
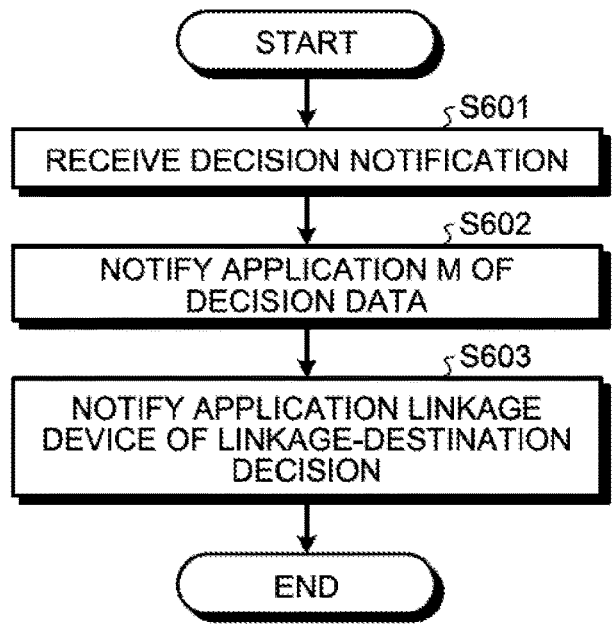
FIG. 15 is a diagram illustrating an example of a flowchart in which the linkage-source device transmits decision notification of the linkage-destination device according to the first embodiment.

Flowchart of Transmission of Decision Notification of Linkage-Destination Device by Linkage-Source Device FIG. 15 is a diagram illustrating an example of a flowchart in which the linkage-source device transmits the decision notification of the linkage-destination device according to the first embodiment.

First, the linkage aggregating unit 103 of the linkage-source device 100 receives decision notification from the linkage-destination device 120 (Step S601), and notifies the application M, which operates on the application 101 and sends the linkage request, of the decision (Step S602). At this time, along with the decision of the linkage-destination device 120, the linkage aggregating unit 103 may stop data transmission from the application M to the linkage-destination devices 120 other than the decided linkage-destination device 120. Then, the linkage aggregating unit 103 notifies the application linkage device 110 of the decision of the linkage destination (Step S603). Information associated with the linkage request corresponding to the decided linkage-destination device and application is used for the decision of the linkage destination.

Figure 16:
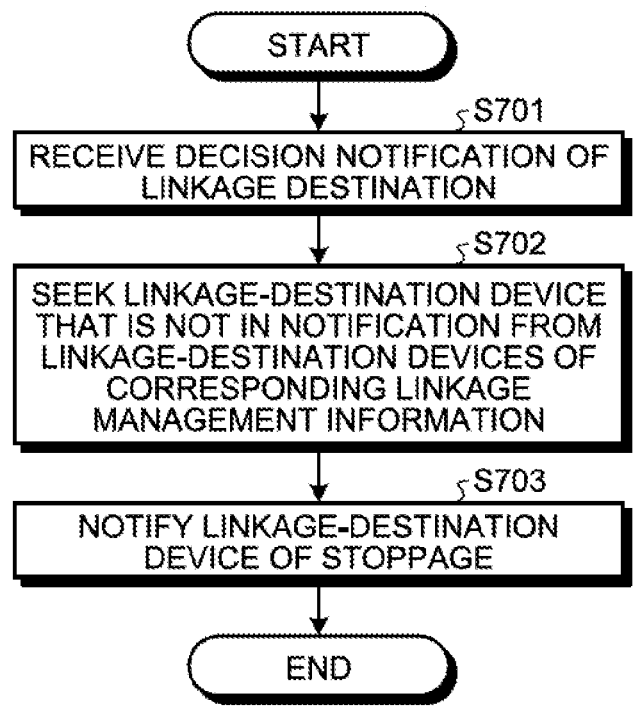
FIG. 16 is a diagram illustrating an example of a flowchart in which the application linkage device notifies a linkage-destination device whose linkage is not decided of stoppage according to the first embodiment.

Flowchart in which Application Linkage Device Notifies Linkage-Destination Device Whose Linkage is not Decided of Stoppage FIG. 16 is a diagram illustrating an example of a flowchart in which the application linkage device notifies a linkage-destination device whose linkage is not decided of stoppage according to the first embodiment.

The linkage controller 112 of the application linkage device 110 receives the decision notification of the linkage destination from the linkage-source device 100 (Step S701). Then, the linkage managing unit 113 seeks a linkage-destination device that is not located in the decision notification of the linkage destination among the linkage-destination devices 120 located in the linkage management information corresponding to the decision notification of the linkage destination (Step S702). Then, the linkage controller 112 notifies the sought linkage-destination device of the stoppage of the corresponding application located in the linkage management information (Step S703).

Figure 17:
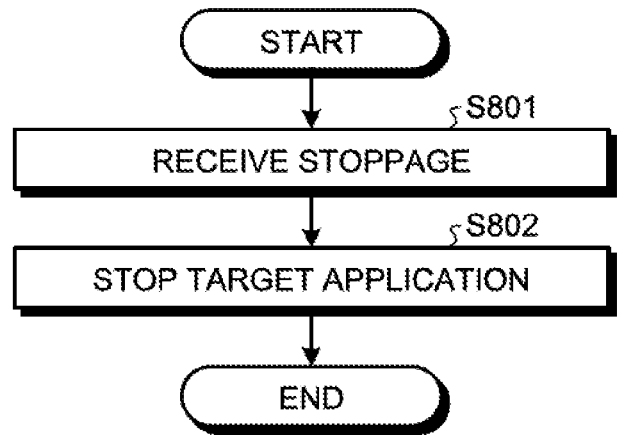
FIG. 17 is a diagram illustrating an example of a flowchart in which the linkage-destination device whose linkage is not decided stops the application according to the first embodiment.

Flowchart in which Linkage-Destination Device Whose Linkage is not Decided Stops Application FIG. 17 is a diagram illustrating an example of a flowchart in which the linkage-destination device whose linkage is not decided stops the application according to the first embodiment.

Upon receiving the application stoppage notification (Step S801), the application controller 123 of the linkage-destination device 120 stops applications in the stoppage notification among the applications 122 (Step S802).

Figure 18:
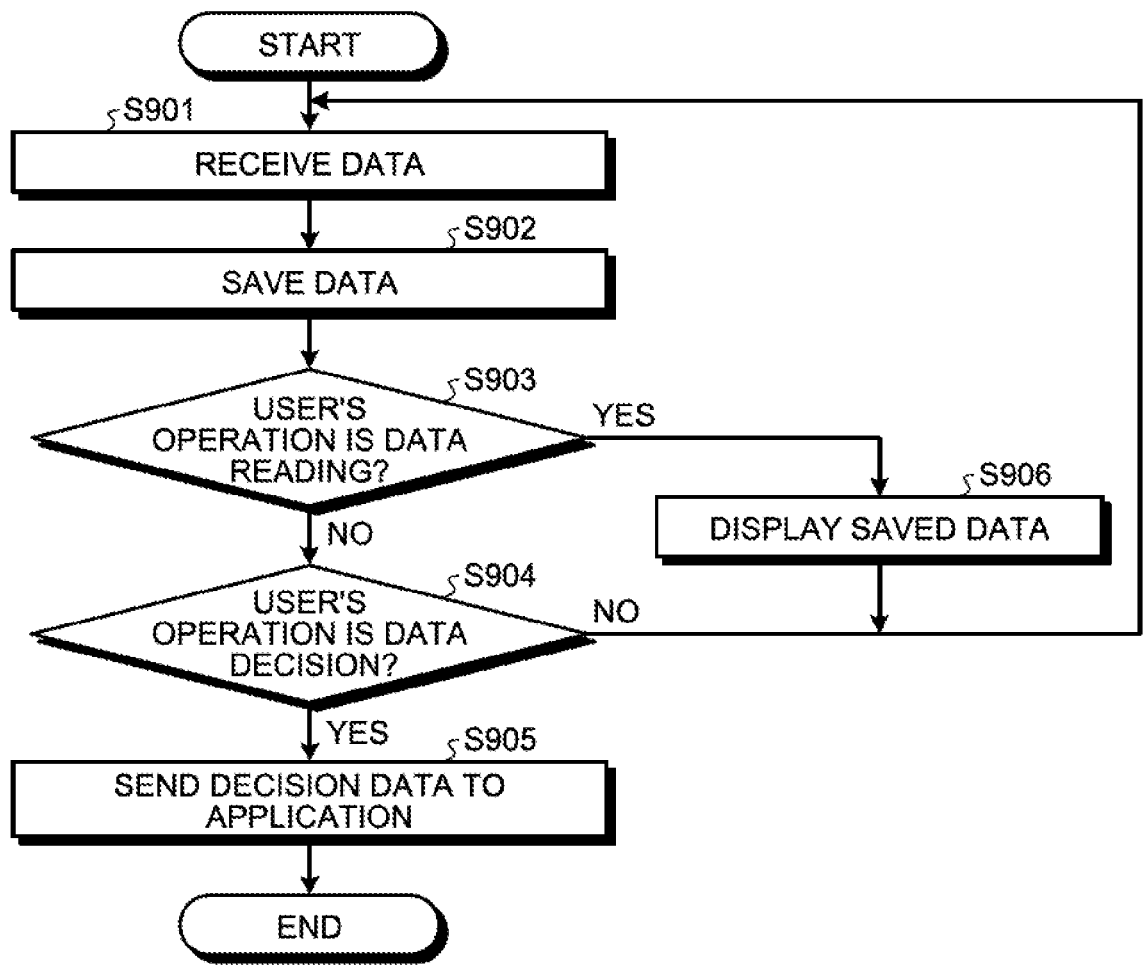
FIG. 18 is a diagram illustrating an example of a flowchart in which the linkage-destination device transmits data to the linkage-source device according to the first embodiment.

Flowchart in which Linkage-Destination Device Transmits Data to Linkage-Source Device FIG. 18 is a diagram illustrating an example of a flowchart in which the linkage-destination device transmits data to the linkage-source device according to the first embodiment. In particular, there is illustrated an example of an operation of the linkage-destination device from the activation request in Step S404 to the transmission of data decision in Step S504 of FIG. 7.

The data transmitting/receiving unit 124 of the linkage-destination device 120 receives data from the request-source application of the linkage-source device 100 (Step S901), and saves the data if needed (Step S902). The data transmitting/receiving unit 124 determines whether the operation of the user is data reading (Step S903). When the operation of the user is data reading (Step S903: Yes), the data transmitting/receiving unit 124 displays the saved data (Step S906) and returns the process to Step S901.

On the other hand, when the operation of the user is not data reading (Step S903: No), the data transmitting/receiving unit 124 determines whether the operation of the user is data decision (Step S904). In case of data decision (Step S904: Yes), the data transmitting/receiving unit 124 notifies the linkage aggregating unit 103 of the decision data (Step S905). The decision data includes information on the decided linkage-destination device 120 and the decided application.

On the other hand, when it is not data decision (Step S904: No), the data transmitting/receiving unit 124 returns the process to Step S901.

Figure 19:
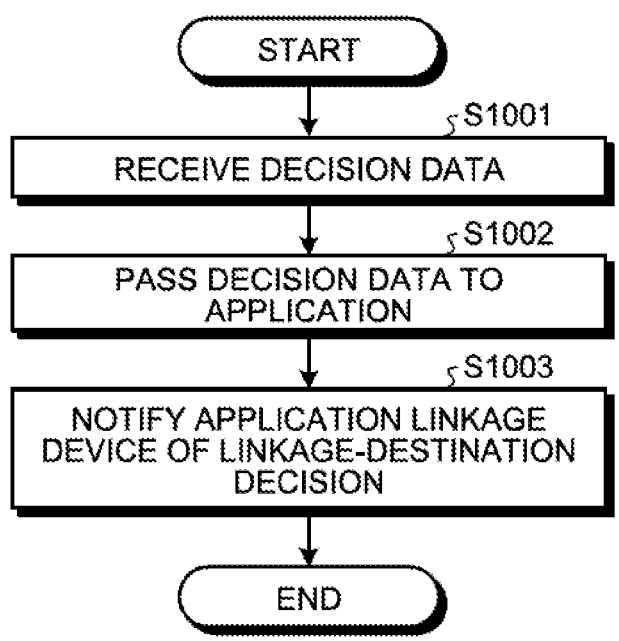
FIG. 19 is a diagram illustrating an example of a flowchart in which the linkage-source device notifies the application linkage device of the decision of a linkage destination according to the first embodiment.

Flowchart in which Linkage-Source Device Notifies Application Linkage Device of Linkage Destination Decision FIG. 19 is a diagram illustrating an example of a flowchart in which the linkage-source device notifies the application linkage device of the decision of the linkage destination according to the first embodiment. In FIG. 19, a process after the linkage-source device 100 sends decision notification in Step S905 of FIG. 18 is illustrated.

The linkage aggregating unit 103 of the linkage-source device 100 receives the decision data for deciding the linkage-destination device 120 (Step S1001), and passes the decision data indicating the linkage-destination device 120 to the application 101 (Step S1002). Then, the linkage aggregating unit 103 notifies the application linkage device 110 of the decision of the linkage destination (Step S1003). The contents of the decision of the linkage destination are as mentioned above.

Specific Example of Application Linkage Control System According to First Embodiment Next, a specific example of a linkage process of an application executed by the application linkage control system 10 according to the first embodiment will be explained.

In the first embodiment, it is assumed that "tablet-A" is used as the linkage-source device 100 and the application M operating on the application 101 is "Report". In order to input a photograph into the application "Report" of the "tablet-A" as a linkage request for another device, the user taps a filming button of the application and requests a linkage-destination device suitable for filming to transmit the linkage request from the "tablet-A". The contents transmitted as the linkage request is to request "OUT (transmission) of image data to the address (12.34.56.110) of tablet-A", like {12.34.56.110, image, OUT} for example. The linkage request of the above contents is transmitted to the application linkage device 110.

The application linkage device 110 receives the linkage request, and extracts linkage-destination candidates adapted to the linkage request from the device/application management information of FIG. 4B. In the first embodiment, (smartphone-A, Camera) and (digital-Camera, Controller) performing OUT of image data are extracted as combinations of linkage-candidate devices and adaptable applications with respect to the linkage request {12.34.56.110, image, OUT}. Then, the extracted linkage candidates are registered in the linkage management information of FIG. 5B in association with the linkage request source and the linkage ID assigned to the linkage request. In the first embodiment, the linkage ID: "coop-1" for the linkage request, the application "Report" of the device "tablet-A"

that is the linkage request source, and the linkage candidates are registered with respect to the linkage request. Furthermore, two activation requests to the application "Camera" of the device "smartphone-A" and the application "Controller" of the device "digital-Camera" are transmitted with respect to the linkage-destination devices of the linkage candidates.

As described above, with the linkage request "coop-1" from the application on the "tablet-A" as a start, the application "Camera" of the device "smartphone-A" and the application "Controller" of the device "digital-camera" are activated. The user takes a picture by using each device and decides an appropriate device suited for the situation of the user, and the decided device notifies the application "Report" of the "tablet-A" of (coop-1, smartphone-A, Camera) as the decided device and application, for example.

The "tablet-A" receives decision notification, and notifies the application M, which sends the linkage request, of the decision. The application M notifies the application linkage device 110 of the linkage request ID and the decided "smartphone-A" and "Camera" in association with each other. In the first embodiment, when the linkage request is "coop-1", the decision notification of the linkage destination may be (coop-1, smartphone-A, Camera).

Upon receiving the decision of the linkage destination, the application linkage device 110 notifies, among the devices and applications activated by the linkage request, the device "digital-camera", which does not exists in the decision notification of the linkage destination, of stoppage to stop the application "Controller".

In the first embodiment, it has been explained that the linkage-destination device 120 sends data from a linkage destination to a linkage source like a camera. When conversely sending data from the linkage source to the linkage destination, for example, even when reproducing moving images of the linkage source on the linkage destination like a display, the application linkage control system 10 according to the first embodiment can select a linkage-destination device that seems to appropriately reproduce images in accordance with the situation of the user, and notify the linkage source of the decided device.

In FIG. 14, the linkage-destination device 120 performs notification for deciding the user as the linkage destination in Step S504. However, when performing previous decision notification with respect to the application activated in Step S502, the decision notification may be automatically performed without the user's operation in Step S504 after Step S502 without performing Step S503. The embodiment is not limited to this.

In FIG. 14, when the user performs the decision notification of the linkage destination in Step S504 in the linkage-destination device 120, the notification is performed by associating the linkage ID with the name of the linkage-destination device 120 and the application activated in Step S502. However, the linkage decision notification only for the linkage ID may be performed. By performing the notification of only the linkage ID, it is possible to stop all candidates of the linkage-destination device and application and cancel the previous linkage.

Effect of First Embodiment

In this way, according to the first embodiment, the application linkage control system 10 includes the linkage-source device 100, the plurality of linkage-destination devices 120 that can be connected to the linkage-source device 100, and the application linkage device 110 that controls the linkage of applications registered in the linkage-source device 100 and the plurality of linkage-destination devices 120. The application linkage device 110 includes the device/application managing unit 111 that manages device information including information used to be connected with the linkage-destination device 120 and information on data to be used by the applications registered in the linkage-destination devices 120, the linkage managing unit 113 that acquires linkage candidates indicating the linkable linkage-destination devices 120 and the linkable applications registered in the linkage-destination devices 120 with reference to the device information managed by the device/application managing unit 111 with respect to the linkage request from the application of the linkage-source device 100, and the linkage controller 112 that activates the applications indicated as the linkage candidates and decides a device performing a linkage and a linkable application registered in the device as a linkage destination from the linkage candidates. According to the configuration, even when there are two or more the linkage-destination devices 120 capable of linking with the linkage-source device 100, the application linkage control system 10 can select the optimum linkage-destination device 120 in accordance with the situation of the user. Moreover, even if the more appropriate linkage-destination device 120 is added, the user can promptly activate and use the application of the added linkage-destination device 120.

In the first embodiment, the linkage controller 112 of the application linkage control system 10 stops applications that are not decided as a linkage destination among the applications that become the linkage candidate. According to the configuration, the linkage controller 112 can suppress consumption of power and traffic.

In the first embodiment, the linkage-destination device 120 of the application linkage control system 10 includes the application managing unit 121 that transmits the device/application information of the linkage-destination device 120 to the application linkage device 110 when detecting the application linkage device 110. According to the configuration, the application linkage device 110 can efficiently register the linkage-destination device 120 and the device/application information.

In the first embodiment, the linkage-source device 100 of the application linkage control system 10 includes the linkage requesting unit 102 that transmits the linkage request from the application being activated on the linkage-source device 100 to the application linkage device 110. According to the configuration, one operation of the application of the linkage source can cause a plurality of devices and applications to link with each other.

In the first embodiment, the linkage-source device 100 of the application linkage control system 10 includes the linkage aggregating unit 103 that decides the linkage-destination device 120 and the application, which link with the application being activated on the linkage-source device 100, from the linkage candidates. According to the configuration, one operation of the application of the linkage source can cause the user to use the device and application of the most desirable linkage destination depending on the situation.

According to the first embodiment, in the application linkage control system 10, the linkage aggregating unit 103 included in the linkage-source device 100 decides the linkage-destination device 120 and the application, which finally have sent data with respect to the linkage request, as a linkage destination. According to the configuration, it is possible to promptly use the device and application of the most desirable linkage destination.

[b] Second Embodiment

According to the first embodiment, when there is a linkage request from the application of the linkage-source device 100, the application linkage control system 10 activates all the applications of the linkage-destination devices 120 that become a linkage candidate. Then, after the linkage-destination device 120 to link with the application of the linkage-source device 100 is decided, the consumption of power and traffic is suppressed by stopping applications other than the decided linkage-destination device 120 among the activated applications. However, the application linkage control system 10 is not limited to this. The application linkage control system 10 may stop applications other than the currently handled device. In this case, when the user handles a device whose application is stopped, the consumption of power and traffic can be further suppressed if the application linkage control system controls to resume the stopped application.

Therefore, the application linkage control system according to the second embodiment monitors the operation of the user with respect to a linkage-destination device 220 to control an operating state of the application of the linkage-destination device 220.

Figure 20:
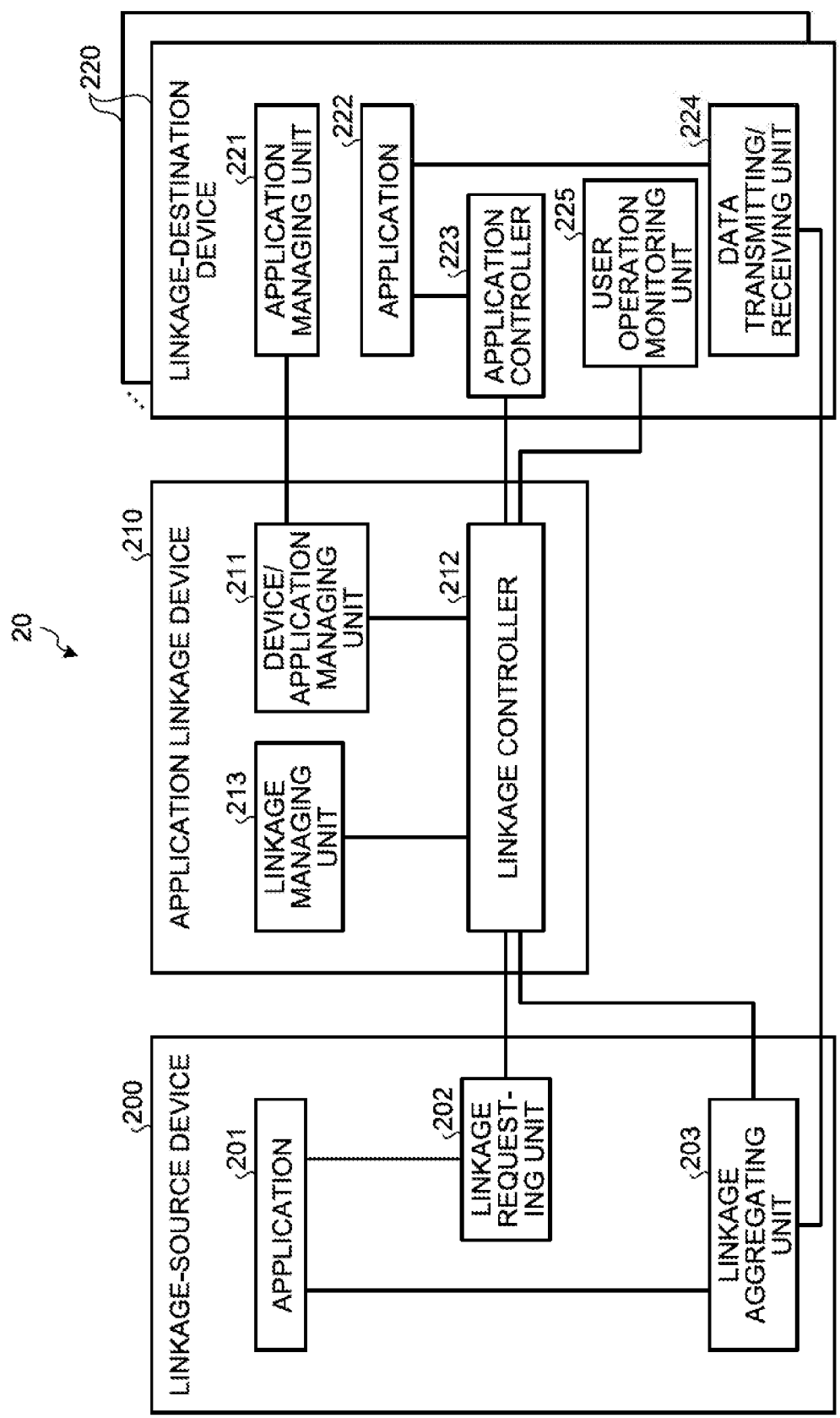
FIG. 20 is a diagram illustrating the configuration of an application linkage control system according to a second embodiment.

Configuration of Application Linkage Control System According to Second Embodiment FIG. 20 is a diagram illustrating the configuration of an application linkage control system 20 according to the second embodiment. Because a linkage-source device 200, an application 201, a linkage requesting unit 202, and a linkage aggregating unit 203 of the application linkage control system 20 have the same configuration as those of the linkage-source device 100 of the application linkage control system 10 illustrated in FIG. 1, their descriptions are omitted. Because an application linkage device 210, a device/application managing unit 211, a linkage controller 212, and a linkage managing unit 213 have the same configuration as those of the application linkage device 110 illustrated in FIG. 1, their descriptions are omitted. The linkage-destination device 220 of the application linkage control system 20 has a configuration that a user operation monitoring unit 225 is added to the linkage-destination device 120 of the application linkage control system 10. Because the other constituent elements of the linkage-destination device 220, namely, an application managing unit 221, an application 222, an application controller 223, and a data transmitting/receiving unit 224 have the same configuration as those of the linkage-destination device 120, their descriptions are omitted.

When detecting the operation of the user with respect to the linkage-destination device 220, for example, detecting an operation on the application, the user operation monitoring unit 225 informs the application linkage device 210 that there is the operation of the user. The contents of notification are, for example, a combination of (linkage ID, name of linkage-destination device, application). The linkage ID is a linkage request in which the relevant linkage-destination device is set as a linkage-destination candidate. The operation of the user may include a case where it is supposed that the user has an impact on the linkage-destination device 220 like the movement of the linkage-destination device 220 in addition to the operation of the application.

Hereinafter, a processing procedure associated with the user operation monitoring unit 225 among the devices that constitute the application linkage control system 20 of FIG. 20 will be explained in FIGS. 21 and 22.

Figure 21:
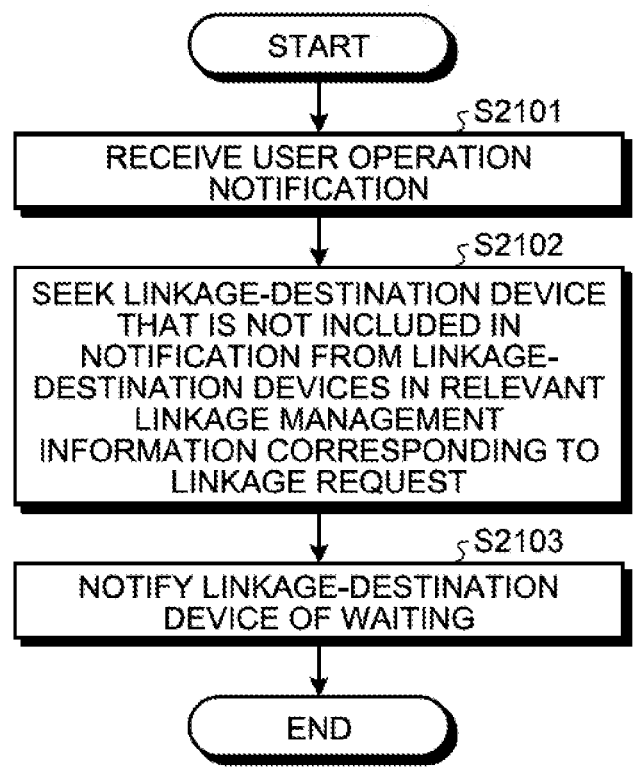
FIG. 21 is a diagram illustrating an example of a flowchart in which an application linkage device notifies a linkage-destination device not-handled by a user of waiting according to the second embodiment.

Flowchart in which Application Linkage Device Notifies Linkage-Destination Device not-Handled by User of Waiting FIG. 21 is a diagram illustrating an example of a flowchart in which the application linkage device notifies the linkage-destination device not-handled by the user of waiting according to the second embodiment. In FIG. 21, it is assumed that the user operation monitoring unit 225 detects the operation of the user with respect to the linkage-destination device 220.

Then, when the linkage controller 212 of the application linkage device 210 receives the occurrence of the operation of the user from the linkage-destination device 220 (Step S2101), the linkage managing unit 213 seeks the linkage-destination device 220 that is not handled by the user among the linkage-destination devices 220 located in the linkage management information corresponding to the linkage request (Step S2102). Then, the linkage controller 212 notifies the sought linkage-destination device 220 of waiting of the corresponding application located in the linkage management information (Step S2103).

Figure 22:
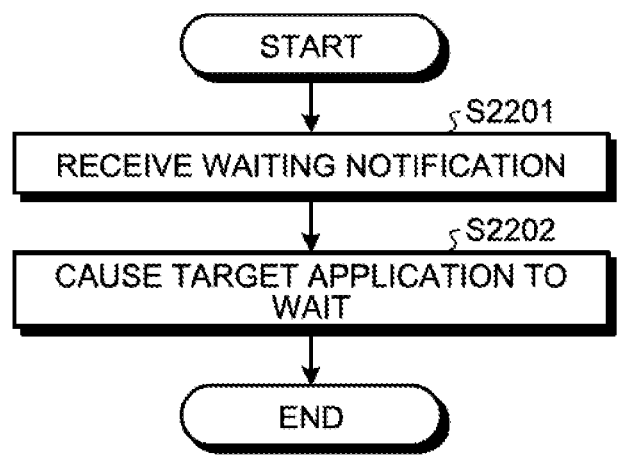
FIG. 22 is a diagram illustrating an example of a flowchart in which the linkage-destination device notified of waiting causes its application to wait according to the second embodiment.

Flowchart in which Linkage-Destination Device Notified of Waiting Causes Application to Wait FIG. 22 is a diagram illustrating an example of a flowchart in which the linkage-destination device notified of waiting causes its application to wait according to the second embodiment.

When receiving the waiting notification of the application (Step S2201), the application controller 223 of the linkage-destination device 220 causes the application notified of waiting by the waiting notification to wait among the applications 222 (Step S2202). Herein, waiting is to stop the application in the state to wait the restart of the application as one type of stoppage.

Specific Example of Application Linkage Control System According to Second Embodiment Next, a specific example of a linkage process of an application executed by the application linkage control system 20 according to the second embodiment will be explained.

Even in the second embodiment, similarly to the first embodiment, it is assumed that the device/application information of the plurality of linkage-destination devices 220 is previously registered in the application linkage device 210 as the device/application management information. It is assumed that "tablet-A" is used as the linkage-source device 200 and the application M operating on the application 201 is "Report". The user requests a linkage-destination device suitable for filming to the device "tablet-A". Furthermore, because processing up to the processes in which linkage candidates are extracted and an activation request is transmitted to the application "Camera" of the device "smartphone-A" and the application "Controller" of the device "digital-Camera" is similar to that of the first embodiment, their descriptions are omitted.

As described above, the application "Camera" of the device "smartphone-A" and the application "Controller" of the device "digital-camera" are activated with the linkage request "coop-1" from the application on the "tablet-A" as a start. On the other hand, when the user takes a picture by using "smartphone-A", the user operation monitoring unit 225 of "smartphone-A" detects that an operation exists. Then, as operation notification to the application linkage device 210, the application linkage device 210 is notified of (coop-1, smartphone-A, Camera), for example.

Upon receiving the operation notification, the application linkage device 210 notifies of waiting, among the devices and applications activated by the linkage request, the device "digital-camera" that does not exist in the operation notification to stop the "application Controller" to be in a waiting state.

As above, it has been explained that the application enters a waiting state when stopping the application. The application may enter a sleep mode. Herein, sleep is to stop the output from the application as one type of stoppage. Generally, the application can be resumed by a predetermined operation such as the push of an escape key.

Alternatively, after stopping the application of the linkage-destination device 220 that does not exist in operation notification, the system may warn the user that the application of the linkage-destination device 220 is a linkage candidate with the application of another device. As a warning method for the linkage candidate, the system may display a screen in waiting, may blink a lamp, or may play the sounds, for example.

Moreover, after stopping the application of the linkage-destination device 220 that does not exist in operation notification, the system may reactivate the stopped application when the user operation monitoring unit 225 detects that the user handles the linkage-destination device 220.

Moreover, when stopping the application with the notification of the user operation monitoring unit 225 of the other device as a start, the system may store the state of the application. For example, in case of the application of the camera, the system may save images captured till then in a storage (not illustrated in FIG. 20) of the linkage-destination device 220 to be stopped, and restore the state of the application before stoppage into the state saved in the storage when being again activated.

Effect of Second Embodiment

In this way, in the second embodiment, the application linkage device 210 controls the application of the linkage-destination device 220 as a linkage candidate to be in a waiting state on the basis of the operation of the user with respect to each of the linkage-destination devices 220. As a result, the application linkage device 210 can suppress the power of the linkage-destination device 220 and the consumption of a resource such as CPU and a memory so as to reduce traffic.

In the second embodiment, the application linkage device 210 further controls the application of the linkage-destination device 220 as a linkage candidate to be in a sleep mode on the basis of the operation of the user with respect to each of the linkage-destination devices 220. As a result, the application linkage device 210 can further suppress the power of the linkage-destination device 220 and the consumption of a resource such as CPU and a memory so as to reduce traffic.

Moreover, in the second embodiment, it has been explained that, when the application linkage device 210 notifies, of stoppage, the linkage-destination device 220 other than the linkage-destination device decided as a linkage destination and then detects the operation of the user, the application linkage device 210 may activate the stopped application. The operation of the user can cause the user to easily perform linkage reorganization of adding a linkage destination by reactivating this application.

Moreover, in the second embodiment, it has been explained that the application linkage device 210 may save and record the state of the activated application in the linkage-destination device 220 other than the linkage-destination device decided as a linkage destination. When this application is reactivated with the detection of the operation of the user as a start, the application can be restored into the latest state by using the saved record.

Moreover, in the second embodiment, it has been explained that the application linkage device 210 can display, with respect to the linkage-destination device 220 other than the linkage-destination device decided as a linkage destination, that the not-decided linkage-destination device 220 is a linkage candidate for the application of the linkage-source device 200. The user can expand a target for selection of the linkage-destination device 220 of the user by referring to the display.

Others

In the first and second embodiments, each component of each device illustrated is not necessarily constituted physically as illustrated in the drawings. In other words, the specific configuration of dispersion/integration of each device is not limited to the illustrated configuration. Therefore, all or a part of each device can dispersed or integrated functionally or physically in an optional unit in accordance with various types of loads or operating conditions. For example, the device/application managing units 111 and 211 may be dispersed into a device managing unit and an application managing unit, and the device/application managing units 111 and 211 and the linkage managing units 113 and 213 may be integrated to a managing unit. Moreover, each component may include therein a storage not illustrated, or may be connected to an external storage device by way of a network.

Figure 23:
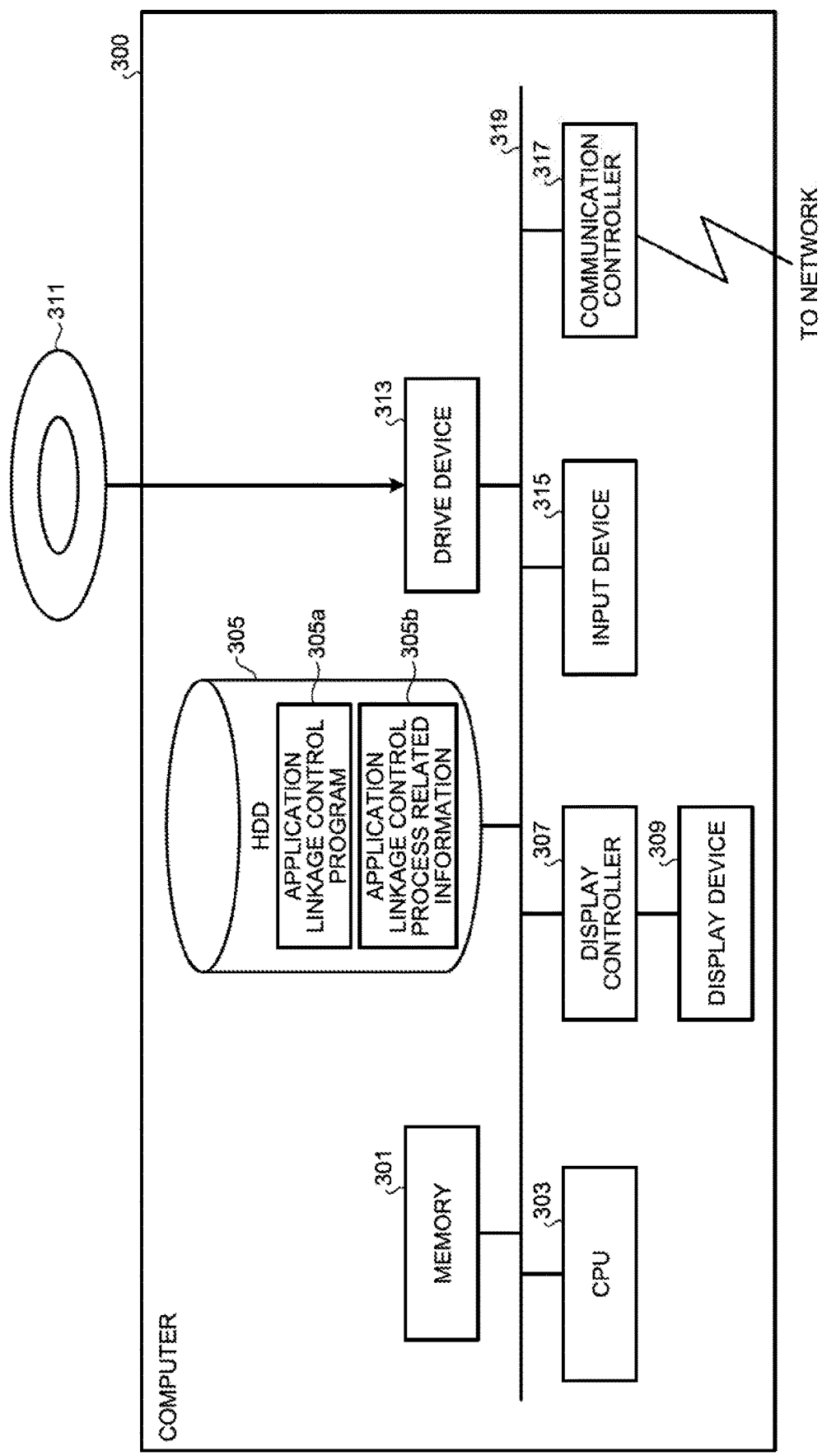
FIG. 23 is a diagram illustrating an example of a computer that executes an application linkage control program.

Moreover, various types of processes described in the above embodiments can be realized by executing a program prepared beforehand with a computer such as a personal computer and a workstation. Therefore, an example of a computer that executes an application linkage control program for realizing the same function as that of the application linkage device 110 illustrated in FIG. 1 will be explained below. FIG. 23 is a diagram illustrating an example of a computer 300 that executes an application linkage control program.

As illustrated in FIG. 23, the computer 300 includes a CPU 303 that executes various types of arithmetic processing, an input device 315 that receives data input from a user, and a display controller 307 that controls a display device 309. The computer 300 further includes a drive device 313 that reads programs or the like from a storage medium, and a communication controller 317 that transmits and receives data to and from other devices via a network. The computer 300 further includes a memory 301 that temporarily stores various types of information, and HDD 305. The memory 301, the CPU 303, the HDD 305, the display controller 307, the drive device 313, the input device 315, and the communication controller 317 are connected to each other via a bus 319.

The drive device 313 is, for example, a device for a removable disk 311. The HDD 305 stores therein an application linkage control program 305a and application linkage control process related information 305b.

The CPU 303 reads out the application linkage control program 305a and develops the program on the memory 301 to execute the program as a process. The process corresponds to each function part of the application linkage device 110. The application linkage control process related information 305b includes the application/device management information and the linkage management information. For example, the removable disk 311 stores information such as the application linkage control program 305a.

The application linkage control program 305a is not necessarily stored in the HDD 305 from the start. For example, this program may be stored in a "transportable physical medium" such as a flexible disk (FD), CD-ROM, a DVD disc, a magneto-optical disk, or an IC card that are inserted into the computer 300. Then, the computer 300 may read out and execute the application linkage control program 305a from these media.

According to one aspect of the embodiments, even when the number of linkage-destination devices linkable from a linkage-source device is two or more, it is possible to select an optimum linkage-destination device depending on the situation of a user.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
   a linkage-source device;
   a plurality of linkage-destination devices that are connectable to the linkage-source device; and
   an application linkage device that controls linkages of applications respectively registered in the linkage-source device and the plurality of linkage-destination devices,
   the application linkage device comprising:
      a processor, wherein the processor executes a process comprising:
         managing device information including information used to be connected with a linkage-destination device and information on data to be used by the application registered in a relevant linkage-destination device;
         acquiring linkage candidates indicative of linkable linkage-destination candidate devices and linkable linkage-destination candidate applications registered in relevant the linkage-destination candidate devices with reference to the device information managed at the managing with respect to a linkage request from the application of the linkage-source device; and
         receiving information of application selection by user after activation of the linkage-destination candidate applications of the linkage-destination candidate devices, and transmitting stoppage notification of the linkage-destination candidate applications to the linkage-destination candidate devices corresponding to applications that is not selected by user among the linkage-destination candidate applications.

2. The information processing system according to claim 1, wherein the transmitting information of application selection includes a linkage candidate, on which selection of data is performed by a user, as the linkage destination among the linkage candidates.

3. The information processing system according to claim 1, wherein the information of application selection includes a linkage candidate that finally sends data with respect to the linkage request among the linkage candidates.

4. The information processing system according to claim 1, wherein
   the linkage-destination device comprises a processor, wherein the processor executes a process comprising:
      monitoring an operation of a user, and
      the transmitting causes linkage-destination devices other than a linkage-destination device monitored at the monitoring to be in a waiting state among the linkage-destination devices that become the linkage candidates.

5. The information processing system according to claim 4, wherein, when among the linkage-destination devices that become the linkage candidates, one of linkage-destination devices other than the linkage-destination device decided as the linkage destination detects the operation of the user at the monitoring, the transmitting activates the stopped application.

6. The information processing system according to claim 4, wherein the transmitting warns, when the linkage-destination devices that are not decided as the linkage destination among the linkage candidates do not detect the operation of the user at the monitoring, the user that the linkage-destination devices not-decided as the linkage destination are linkage candidates with respect to the application of the linkage-source device.

7. The information processing system according to claim 5, wherein the transmitting records states of the activated applications in linkage-destination devices other than the linkage-destination device decided as the linkage destination, and, when one of the applications is activated, restores the activated one application to the recorded latest state.

8. The information processing system according to claim 1, wherein
   the linkage-destination device comprises a processor, wherein the processor executes a process comprising:
      monitoring an operation of a user, and
      the transmitting causes linkage-destination devices other than a linkage-destination device monitored at the monitoring to be in a sleep mode among the linkage-destination devices that become the linkage candidates.

9. The information processing system according to claim 8, wherein, when among the linkage-destination devices that become the linkage candidates, one of the linkage-destination devices other than the linkage-destination device decided as the linkage destination detects the operation of the user at the monitoring, the transmitting activates the stopped application.

10. The information processing system according to claim 8, wherein the transmitting warns, when the linkage-destination devices that are not decided as the linkage destination among the linkage candidates do not detect the operation of the user at the monitoring, the user that the linkage-destination devices not-decided as the linkage destination are linkage candidates with respect to the application of the linkage-source device.

11. The information processing system according to claim 9, wherein the transmitting records states of the activated applications in linkage-destination devices other than the linkage-destination device decided as the linkage destination, and, when one of the applications is activated, restores the activated one application to the recorded latest state.

12. An information processing method that causes a computer to execute a process comprising:
   managing device information including information used to be connected with linkage-destination devices and information on data to be used by applications registered in the linkage-destination devices;

acquiring linkage candidates indicative of the linkable linkage-destination candidate devices and linkable linkage-destination candidate applications registered in relevant the linkage-destination candidate devices with reference to the device information with respect to a linkage request from an application of a linkage-source device; and receiving information of application selection by user after activation of the linkage-destination candidate applications of the linkage-destination candidate devices, and transmitting stoppage notification of the linkage-destination candidate applications to the linkage-destination candidate devices corresponding to applications that is not selected by user among the linkage-destination candidate applications.

13. An information processing device comprising:

a processor, wherein the processor executes a process comprising:

managing device information including information used to be connected with linkage-destination devices and information on data to be used by applications registered in the linkage-destination devices;

acquiring linkage candidates indicative of linkable linkage-destination candidate devices and linkable linkage-destination candidate applications registered in relevant the linkage-destination candidate devices with reference to the device information managed at the managing with respect to a linkage request from the application of the linkage-source device; and receiving information of application selection by user after activation of the linkage-destination candidate applications of the linkage-destination candidate devices, and transmitting stoppage notification of the linkage-destination candidate applications to the linkage-destination candidate devices corresponding to applications that is not selected by user among the linkage-destination candidate applications.

* * * * *